United States Patent
Gordon et al.

(10) Patent No.: US 6,677,929 B2
(45) Date of Patent: Jan. 13, 2004

(54) OPTICAL PSEUDO TRACKBALL CONTROLS THE OPERATION OF AN APPLIANCE OR MACHINE

(75) Inventors: Gary B. Gordon, Saratoga, CA (US); Edward L Miller, Loveland, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 204 days.

(21) Appl. No.: 09/813,624

(22) Filed: Mar. 21, 2001

(65) Prior Publication Data

US 2002/0135565 A1 Sep. 26, 2002

(51) Int. Cl.[7] ................................................ G09G 5/00
(52) U.S. Cl. ..................... 345/156; 345/173; 345/175
(58) Field of Search ............................... 345/156, 158, 345/164, 165, 166, 167

(56) References Cited

U.S. PATENT DOCUMENTS

| | | | |
|---|---|---|---|
| 4,024,500 A | 5/1977 | Herbst et al. | 340/146.3 |
| 5,034,989 A | 7/1991 | Loh | 382/13 |
| 5,058,182 A | 10/1991 | Kuan et al. | 382/25 |
| 5,105,468 A | 4/1992 | Guyon et al. | 382/14 |
| 5,327,160 A * | 7/1994 | Asher | 345/156 |
| 5,455,875 A | 10/1995 | Chevion et al. | 382/311 |
| 5,459,809 A | 10/1995 | Kim et al. | 382/160 |
| 5,481,625 A | 1/1996 | Suzuki | 382/187 |
| 5,545,857 A * | 8/1996 | Lee et al. | 178/18 |
| 5,578,813 A | 11/1996 | Allen et al. | 250/208.1 |
| 5,627,564 A * | 5/1997 | Yang | 345/146 |
| 5,644,653 A | 7/1997 | Sunakawa et al. | 382/187 |
| 5,742,705 A | 4/1998 | Parthasarathy | 382/185 |
| 5,786,804 A | 7/1998 | Gordon | 345/158 |
| 5,862,251 A | 1/1999 | Al-Karmi et al. | 382/186 |
| 5,970,170 A | 10/1999 | Kadashevich et al. | 382/187 |
| 5,991,439 A | 11/1999 | Tanaka et al. | 382/178 |
| 6,054,984 A * | 4/2000 | Alexander | 345/339 |
| 6,057,540 A | 5/2000 | Gordon et al. | 250/221 |
| 2001/0040551 A1 * | 11/2001 | Yates et al. | 345/156 |

FOREIGN PATENT DOCUMENTS

| | | |
|---|---|---|
| GB | 2355055 A | 10/1999 |
| WO | WO88/02522 A1 | 9/1986 |

* cited by examiner

Primary Examiner—Kent Chang
Assistant Examiner—Tommy Sheng
(74) Attorney, Agent, or Firm—Edward L. Miller

(57) ABSTRACT

An optical fingertip tracker, which may be a pseudo trackball, responds to the motion of the texture on one of the user's digits pressed against an image input aperture to produce motion signals processed within an appliance to be controlled. The appliance may have a minimal GUI, such as an LCD display having only a modest number of low resolution pixel locations and/or preestablished characters or icons. An appliance control parameter is set or adjusted in response to translation of the fingertip along a particular axis. E.g., to enter a parameter value (volume) a changing bar graph can be displayed. The display might even be omitted; to set the tone control of an audio appliance it can be sufficient to simply adjust the tone until the result is as desired. A numeric display of control parameter digits may be desirable, as when moving the fingertip tunes a receiver. There can be several particular axes along which fingertip movement changes an associated appliance control parameter. Other appliances can include character recognition of input characters traced by the fingertip. A pressure sensitive switch coupled to the fingertip tracker can serve as a delimiting mechanism useful in ratification of interpreted results and in editing strings that have been input. Excursions is a loss-of-correlation signal can be detected and interpreted as tapping the image input aperture with the fingertip. Such "taps" and "double taps" can be defined, and have selected meanings associated therewith that may be used in conjunction with, or in place of, the pressure sensitive switch.

30 Claims, 10 Drawing Sheets

OPTICAL PSEUDO TRACKBALL CONTROLS THE OPERATION OF AN APPLIANCE OR MACHINE

REFERENCE TO RELATED PATENTS

The subject matter of the instant Application is related to that of U.S. Pat. No. 6,057,540 entitled MOUSELESS OPTICAL AND POSITION TRANSLATION TYPE SCREEN POINTER CONTROL FOR A COMPUTER SYSTEM filed Apr. 30, 1998, and is also related to the subject matter described U.S. Pat. No. 5,578,813 filed Mar. 2, 1995, issued Nov. 26, 1996 and entitled FREEHAND IMAGE SCANNING DEVICE WHICH COMPENSATES FOR NON-LINEAR MOVEMENT. This application is also related to the subject matter described in U.S. Pat. No. 5,786,804, issued on Jul. 28, 1998, filed Oct. 6, 1995, entitled METHOD AND SYSTEM FOR TRACKING ATTITUDE, and also assigned to Hewlett-Packard Co. These three Patents describe techniques for the tracking of position movement, which techniques include components of the preferred embodiment described below. Accordingly, U.S. Pat. Nos. 6,057,540//5,578,813 and 5,786,804 are hereby incorporated herein by reference.

The subject matter of the instant disclosure is also related to machine recognition of hand written or cursive characters. This is an established art, as shown by the many Patents issued for the different techniques of, and uses for, such recognition. See, for example, U.S. Pat. Nos. 4,024,500//5,644,653// 5,970,170//5,459,809//5,058,182//5,105,468//5,034,989//5,742,705//5,862,251//5,991,439// 5,455,875 and 5,481,625 all directly pertain to the type of character recognition of interest herein, and are each therefore incorporated herein by reference. The ability of a FAX machine to dial a telephone number hand written on a document is disclosed in U.S. Pat. No. 5,991,439. A correction scheme based on a display is disclosed in U.S. Pat. No. 5,455,875 (lines 9–20 of Col. 5) and FIG. 16 of U.S. Pat. No. 5,481,625 shows character by a fingertip upon a skin resistance type tablet (lines 3–9 of col. 10).

BACKGROUND OF THE INVENTION

Most appliances and machines have controls by which the appliance is operated by a user. The usual case, and especially so before the advent of microprocessor control, was for some mechanically moveable element, such a pivoted lever or journaled shaft, to be moved by the operator. Something (e.g., a valve or a brake pad) connected to the mechanically moveable element directly affected the operation of the appliance. Even in the case of electrical and electronic appliances, the contacts of switches, wipers of potentiometers, rotors of capacitors and slugs of inductors were moved by the power of the human hand (or perhaps a foot). We have nothing against hands (or feet), and merely wish to point out that, even including power amplification servo systems, the movement of the hand operated control was accompanied by a corresponding alteration in the condition of some circuit, which is to say, a fundamental shift in value of some circuit component was produced by the mechanical motion. Consider, for example, an older radio for the consumer market. If one wanted to increase the volume, she rotated the shaft of a pot used as a variable ratio voltage divider in an audio amplifier circuit. Likewise, to change the station the value of a reactive component was directly altered by mechanical motion provided by the user.

Once microprocessors became ubiquitous, the situation changed to include additional control paradigms. Digital control became an established technique, with DAC's (Digital to Analog Converters), FET's (Field Effect Transistors) and varactor diodes providing ways to change circuit behavior (e.g., gain, resonance) based on a binary value stored in a register. New control paradigms emerged, such as a radio having a display of digits indicating the currently tuned station frequency and various buttons to incrementally tune up or down, and without benefit of a movable capacitor or tuning slug. With the further advent of GUI's (Graphical User Interfaces) implemented with standardized operating systems running on standardized microprocessors, the motion of a computer mouse (or other screen pointer mechanism) can replace the act of imparting genuine mechanical motion to actual variable components within a circuit. With these control paradigms the need for mechanical coupling between the user's hand and the electronic component whose value is to change has gone away completely. Some very complex control schemes are realizable in this way, which are often beyond the scope of what would be practical with actual front panel controls ("real hardware"). So, to change the colors seen in a computer generated image, one interacts with menus or with other control paradigms presented by a GUI. To program a VCR one fiddles (sometimes for a long time) with the arrow keys on a remote control while studying what is shown on the screen of the TV.

Increasing complexity and miniaturization are two trends whose courses appear nowhere near yet run. Such pocket sized devices as PDA's (Personal Digital Assistants), wireless or cellular phones, and GPS (Global Positioning System) receivers have, if individual transistors were counted as parts, a tremendous number of components. They also have large number of "controls" that can be altered to produce different behavior. Typically, there is no way that corresponding actual physical controls could be included in the product. They add expense, they decrease reliability, when made small they are easily broken and are hard to use, etc. Even if reduced to truly miniature form, there would often not be enough room on the product for the number of actual physical controls that would be needed. What has made such pocket-sized products possible in the first instance are, of course, the microprocessor, a rudimentary keyboard and a limited function dedicated display. The use of what may be termed "entry keys" interacts via a display to produce a large number of "virtual controls" while requiring only a modest number of "real controls" to serve as the entry keys. Larger and more sophisticated (or perhaps merely more technical) appliances such as processor controlled digital oscilloscopes or logic analyzers typically have (at least as an option) a full keyboard to support the remaining full disaster: a commercial windows type operating system (whether from Microsoft, Apple or a UNIX variant based on X-11) and a computer grade display. Such systems require a screen pointer and a way to control it; they typically use a mouse.

Many useful appliances and machines are complex in their operation, but as pocket sized or hand held units, are too small for a mouse (or any of its direct equivalents) to be practical (or in some cases, even desirable). But the small size in no way means that there is not also a complex control set. There is often plenty of room in a hand held unit for a powerful processor and a lot of memory. Display technology is no serious limitation, either. The capabilities of a mouse powered GUI is sometimes appropriate for these appliances; it is the mouse itself (or anything else that sticks out to snag on clothing or get broken off) that is unwelcome. Sometimes pairs of arrow or cursor control keys (for up/down, left/right)

have been used in place of a mouse. That technique consumes space on the keyboard and is limited to separate individual steps of fixed size in different directions; for example, one could not "directly" translate the screen pointer along a path inclined at 45° (or some other arbitrary angle) to one of the axes represented by one of the pairs of keys (one would have to press the keys in alternation, and the step size of screen pointer motion may become an issue). We need the capabilities of a mouse without the bulk and mechanical fussiness of the mouse (or of its cousin, the conventional track ball). It was partly in that spirit that the Application MOUSELESS OPTICAL AND POSITION TRANSLATION TYPE SCREEN POINTER CONTROL FOR A COMPUTER SYSTEM was filed. The optical fingertip tracking apparatus disclosed therein (and herein, too) is a good mouse eliminator for lap top computers and the like.

But upon reflection it is also more than that. It is sufficiently small, yet provides outstanding resolution, and imposes no severe speed or power consumption limitations. The chip set that provides the motion signals is self contained, as it were, so that none of the computational overhead needed to perform the basic tracking of the fingertip need bother the mechanisms in the appliance to which it is added. That is, if there are sufficient software resources to support a mouse and GUI, then the fingertip tracking ability is essentially a viable direct substitute for a mouse. However, owing to its small size and being responsive to the motion of a fingertip (or pad of a thumb), it can be used as part of an additional control or data input paradigm that is impractical for a mouse. The purpose of the instant Application is principally to set forth some new ways to control the operation of an appliance through the use of an improved tip-of-a-digit (fingertip) tracker that we shall come to call a "pseudo trackball." It will also become clear that a full blown conventional GUI of the sort used for a mouse will not in every case be necessary, nor even desirable, and that a minimal GUI crafted to match the particular features and needs of the appliance or machine is the best choice.

The nature of the conventional (mechanical) mouse, used in conjunction with a cooperating mouse pad, is briefly set out below. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface slide easily over the fabric, but the rubber ball does not skid, but instead rolls as the mouse is moved. Interior to the mouse are rollers, or wheels, that contact the ball at its equator and convert its rotation into electrical signals representing orthogonal components of mouse motion. These electrical signals are coupled to the computer, where software responds to the signals to change by a $\Delta x$ and a $\Delta y$ the displayed position of a pointer (cursor) in accordance with movement of the mouse. The user moves the mouse as necessary to get the displayed pointer into a desired location or position. Once the pointer on the screen points at an object or location of interest, one of one or more buttons on the mouse is activated with the fingers of the hand holding the mouse. The activation serves as an instruction to take some action, the nature of which is defined by the software in the computer.

Over the years, a number of optical techniques have been proposed for a computer mouse, but to date the mechanical mouse remains the most widely used pointing device. One recent optical development that appears likely to gain a significant degree of acceptance is that described in U.S. patent application Ser. No. 09/052,046, entitled SEEING EYE MOUSE FOR A COMPUTER SYSTEM, filed Mar. 30, 1998, by Gordon, Knee, Badyal and Hartlove and assigned to Hewlett-Packard Co. That Application discloses the use of techniques described in the aforementioned incorporated Patents to produce an optical mouse that navigates upon an arbitrary surface. The device disclosed therein is a non-mechanical mouse that is viable from a manufacturing perspective, relatively inexpensive, reliable, and appears to the user as essentially the operational equivalent of the conventional mouse. This new type of optical mouse has a familiar "feel" and is free of unexpected behaviors. It does not rely upon cooperation with a mouse pad, whether special or otherwise, but is instead able to navigate upon almost any arbitrary surface. It uses a single imaging integrated circuit to track translation of that circuit (and by implication, the mouse itself) across the arbitrary surface.

It is still a mouse, however, and needs some sort of surface to operate upon, and is thus inappropriate for use with a pocket sized apparatus or machine. Also, a mouse requiring the movement of all or most of the hand is not conducive to tracing shape of a block or cursive character. Such a mode of input can remove the need for additional keys on the appliance or machine, thus preserving functionality while reducing the size of the appliance or machine.

It would be desirable if the optical mechanism (the fingertip tracker) of the above-mentioned MOUSELESS OPTICAL POSITION AND TRANSLATION . . . Patent could be improved to allow position translation type screen pointer control for a GUI, including menu entry selection, mode selection, parameter value selection and character input by character recognition, but without an actual mouse or other moveable appendage that wears, binds or gets bent or broken off entirely. In addition, there are applications where, for example, one or more parameter values are to be adjusted and a complex GUI is unneeded or is otherwise undesirable. There are even cases where no GUI is needed or is desirable. What to do?

SUMMARY OF THE INVENTION

An optical digit (fingertip) tracker responds to the motion of an image for a portion of the texture (think: "fingerprint") on one of the user's digits, which may be a thumb or a finger. The tip of the digit is pressed against an image input aperture preferably containing a transparent domed element resembling a tiny track ball, but which does not move. Since it otherwise resembles a rather small trackball in both appearance and feel, we shall call it a "pseudo trackball." Motion of the digit produces motion of the image that is in turn detected by a motion transducer and translated into corresponding motion signals used by an appliance or machine control circuit to set or change the value of one or more associated appliance control parameters. The image input aperture may be the surface of a lens (or other optical image coupling element) that is itself placed in a convenient location on the housing of the appliance or machine to be controlled. As the image "moves" within the movement sensor a portion of it disappears from the field of view, and is replaced with other image patterns from an adjacent portion of the digit. A sufficiently changed image is maintained as a new current image, which then itself changes, and so on. A comparison between a reference frame (previous image) and the current frame (present image) allows detection of the amount and direction of image motion. These detected amounts are formatted as motion signals and sent to software within an appliance to be controlled. The motion signals can be used in conjunction with a full blown commercial GUI, if that is appropriate, to perform menu entry selection, movement of sliders to set parameter values and modes, just as if those motion signals originated with a conventional mouse. However, there is no mouse, and a GUI of considerably reduced complexity is also possible, where, for example, an LCD display having only a modest number of low resolution pixel locations and/or preestablished characters or icons can accomplish the needed functionality. For example, to enter a parameter value (such as the setting of a tone control on an audio appliance) a bar graph can be displayed in response to translation of the fingertip along a particular axis. The display could even be omitted. To set the volume of an audio appliance it is, in principle, sufficient to simply adjust the volume in real time as the tip of the digit translates over the fingertip tracker. Presumably, the user does not need to see how loud it is; he can hear it. In some instances a numeric display of digits representing an appliance control parameter may be desirable, as when tuning a receiver (moving the fingertip changes the station). Most listeners would prefer to know what station they are tuned to. For some appliances a preliminary mode selection process (e.g., navigating a menu and selecting an entry) may be desirable prior to such parameter adjustment; in others such preliminary activity may be unnecessary. In a radio receiver, for example, it may be a permanent feature of the control paradigm that volume is adjusted by fingertip motion in a front to back direction, tuning is left to right, and tone control is along an axis inclined by 45° to the other two.

Other appliances include character input as part of their operation. Examples include telephones (dialing or storing phone numbers, easy entry of names), GPS receivers (say, for entry of a position of interest) and video and digital cameras (date and comment information to appear on the recorded image). Rather than scroll a highlighted field across individual characters in a list and then choosing one by pressing a select key, and then repeating that process for each additional character, the fingertip can simply trace the desired characters, one at a time upon the pseudo trackball. The interpreted result can appear in a display. A pressure sensitive switch coupled to the pseudo trackball can serve as a delimiting mechanism useful in ratification of interpreted results and in editing strings that have been input. Excursions is a loss-of-correlation signal can be detected and interpreted as tapping the image input aperture with the fingertip. Such "taps" and "double taps" can be defined, and have selected meanings associated therewith that may be used in conjunction with, or in place of, the pressure sensitive switch.

DESCRIPTION OF A PREFERRED EMBODIMENT

Figure 1:
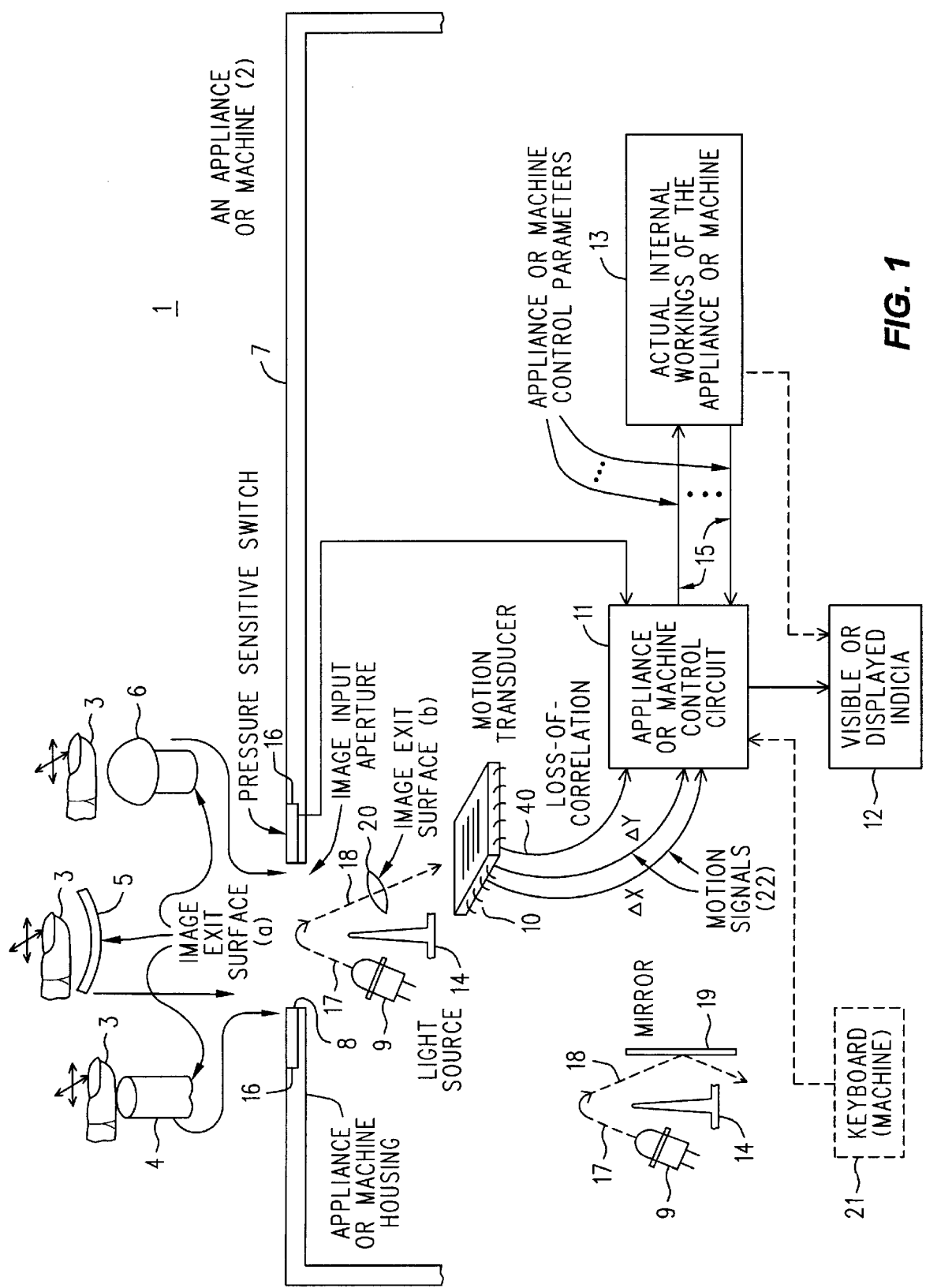
FIG. 1 is a generalized block diagram of an appliance or machine that tracks the motion of the tip of an operator's digit to set or alter the value of at least one appliance (or machine) control parameter that controls the operation of the appliance (machine).

Refer now to FIG. 1, wherein is shown a generalized block diagram 1 of an appliance or machine 2 wherein the value of at least one appliance control parameter 15 is determined by the motion of the tip of an operator's digit 3 against an image input aperture 8 disposed at a convenient location on a housing 7.

Before proceeding further, it is appropriate that we set out what we mean by the terms "appliance" and "machine". An appliance is a self-contained device, tool, apparatus or device that performs a specific function, possibly (indeed, probably) comprised of a related collection of cooperating sub-functions. It might be powered by the AC mains, or by batteries. It might be hand held, sit on a table top, or bolted to a factory floor. As we define the term for use herein, including the claims, an appliance does not have a keyboard that allows individual keystroke entry of the entire set of alphabetic characters. ("Alphabetic" does not include numeric digits.) Furthermore, a general purpose computer, workstation, PC, "laptop" or mainframe is not an "appliance" as we are defining the term. A computer's specific function is to run one or more application programs. It is true that a general purpose computer can, through suitable programming, control an appliance, but that does not make the computer part of that appliance. It is true that insofar as the specific function of the computer is to control the appliance through a suitable program, the computer would otherwise appear to be an appliance that controls another appliance, but that is excluded by the keyboard portion of the definition. A computer that has a CD drive and an audio CD player program that drives speakers is computer disguised as a CD player. It is not an innocent audio appliance that just happens to have a hard drive, windowed operating system, monitor and full keyboard.

It is true that many appliances have microprocessors that control the operation of the appliance through the action of an embedded system. Embedded systems are generally permanently stored in ROM (Read Only Memory), and they often respond to external commands, some of which may originate as keystrokes. We include these cases in the definition of an appliance as long as there is no alphabetic keyboard. That is, there can be a RESET or CLEAR key, but no strings of individual keystrokes for the character sequences R_E_S_E_T or C_L_E_A_R. However, an applian a displayed menu of alphabetic "keys" or an image of an alphabetic keyboard is displayed and "keys" are selected with actual arrow keys and then invoked with an actual select or execute key. In such a case it is clear that the actual keystrokes only indirectly produce desired "virtual key" keystrokes according to an intervening interpretation. That is not the alphabetic keyboard of the definition, since the actual sequence of real keystrokes is altogether different. For example, such a sequence of real keystrokes would, in general, be meaningless to an observer who could only see those real keystrokes and not the display. He would have no idea of what any sequence of "virtual keys" was.

The term "machine" is hereby defined to encompass an appliance as defined above, as well as that which would otherwise be an appliance except that it does have an alphabetic keyboard with a key per character.

To continue, then, an operator of the appliance or machine places the tip of his or her finger (or pad of a thumb) over the image input aperture 8. (Hereafter, we shall simply use the more inclusive term "machine" where both meanings are appropriate, with the understanding that it means both "appliance" and "machine" unless we say otherwise.) Typically, the image input aperture would contain some sort of transparent piece (4, 5, 6) that may or may not perform an optical function while it keeps dirt and other debris from entering the housing. Examples of these pieces include a rod lens (4, and described in U.S. Pat. No. 6,057,540 as a transparent stud 3, 4, and 5), a simple transparent disc shaped plug 5 with little or no optical properties, and (what is preferred) a dome or mushroom shaped "button" 6 (a pseudo trackball). Preferably, button 6 is small, perhaps two to three millimeters in diameter for its domed or spherical portion. It may also be recessed into the housing 7 so that only some fraction of its diameter extends above the outer surface of the housing. Those that have tried it report that it feels just as if there were an actual rolling "BB" sized track ball under their finger. There is excellent tactile feedback about where on the fingertip the image is being taken, so that it is easy to avoid accidently running the fingertip off the outer surface of the pseudo trackball, which is serving as the image input aperture.

It is also possible that the image input aperture does not seal the housing at all, but is instead empty, even though this would appear to have certain disadvantages when in ordinary use. (Dirt, spilled coffee, cookie crumbs and the like could enter the housing and cause mischief.) On the other hand, if it does seal the housing, it could be a waterproof seal that still allows easy parameter value adjustment without the need for conventional mechanical seals against a rotating shaft (e.g., O-rings, etc.). The techniques described herein thus allow easy and effective waterproofing for certain classes of equipment (e.g., hand-held transceivers) that were in the past difficult or awkward to waterproof.

Other items in an optical path involving the tip of the digit 3 are: a light source 9, which may be an LED (Light Emitting Diode), either of the visible or infrared variety, and that emits light 17; a lens or lens assembly 20 that may cooperate with lensing action by any of pieces 4–6, or, if they perform none, that by itself focuses an image 18 of the tip of the digit onto an array of photo sensors within a motion transducer 10; and, an optional baffle 14 that prevents direct illumination of the photo sensor array by the light source 9. Additionally, there may optionally be a mirror 19 in the optical path taken by illuminating light 17 and image 18 formed of light reflected from the fingertip 3.

The motion transducer 10 produces motion signals 22 that correspond to motion of the digit 3 along coordinate axes. These motion signals are coupled to an appliance or machine control circuit 11, where they are interpreted to produce appliance (or machine) control parameters 15 that are in turn coupled to the actual internal workings 13 of the appliance or machine. It is through these control parameters 15 (of which there may be many) that control is actually realized. Additional interpretation within the control circuit 11 may produce visible or displayed indicia 12 that indicates mode information or control parameter value(s). The visible or displayed indicia can include LED's next to permanent legends carried on the housing and that are illuminated when the meaning of the legend is in effect, characters or icons built into an LCD (Liquid Crystal Display) that are made visible as appropriate, and even a totally pixelized display capable of forming arbitrary images. Parameter values can be indicated as sequences of digits, by length of a bar graph, or by the size of some other graphical device (e.g., pie chart), any of which may have a label associated therewith. The visible or displayed indicia 12 can be controlled by the control circuit 11, by the internal workings 13, or both, as appropriate.

Preferably, there is also a switching mechanism of some sort, responsive to pressure exerted by the fingertip 3 against the periphery of the image input aperture 8, or perhaps by pressure against one of transparent elements 4, 5 or 6 and communicated by it to the periphery of the image input aperture. Things could also be arranged such that the switching element was mechanically coupled to the inside the housing without being referenced to the periphery of the image input aperture. The switching mechanism will serve a function similar to that of a "button" (which is no more than a finger operated switch) on a conventional mouse, and is electrically coupled to the control circuit 11.

Finally, if what is of interest is a machine, there would be an alphabetic keyboard 21.

The particular details of the motion transducer 10 mentioned above may be found in the incorporated Patents. We offer here for the convenience of the reader only the barest summary of what can be found there.

The preferred optical navigation optically detects motion by directly imaging as an array of pixels the various particular optical features visible on a surface, such as a fingertip. IR or visible light reflected from a fingertip is focused onto a suitable array (say, 16×16 or 24×24) of photo detectors. The responses of the individual photo detectors are digitized to a suitable resolution (say, eight or perhaps only four or even as few as one bit) and stored as a frame into corresponding locations within an array of memory.

Preferably, the size of the image projected onto the photo detectors is a near unity magnification of the original features being imaged. The size of the photo detectors and their spacing is such that there is much more likely to be one or several adjacent photo detectors per image feature, rather than the other way around. Thus, the pixel size represented by the individual photo detectors corresponds to a spatial region on the fingertip of a size that is generally smaller than the size of a typical spatial feature on that fingertip (i.e., a ridge in the whorls of skin on the fingertip). The overall size of the array of photo detectors is preferably large enough to receive an image having several features. In this way, images of such spatial features produce translated patterns of pixel information as the fingertip moves. The number of photo detectors in the array and the frame rate at which their contents are digitized and captured cooperate to influence how fast the fingertip can be moved and still be tracked. Tracking is accomplished by comparing a newly captured sample frame with a previously captured reference frame to ascertain the direction and amount of movement.

One way that may be done is to shift the entire content of one of the frames by a distance of one pixel (corresponds to a photo detector), successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" is also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide motion signals ($\Delta X$ and $\Delta Y$) of a convenient granularity and at a suitable rate of information exchange.

A brief note is perhaps in order about how the shifting is done and the correlation values obtained. The shifting is accomplished by using address offsets for memories that can output an entire row or column of an array at one time. Dedicated arithmetic circuitry is connected to the memory array that contains the reference frame being shifted and to the memory array that contains the sample frame. The formulation of the correlation value for a particular trial shift (member of the nearest or near neighbor collection) is accomplished very quickly. The best mechanical analogy is to imagine a transparent (reference) film of clear and dark patterns arranged as if it were a checker board, except that the arrangement is perhaps random. Now imagine that a second (sample) film having the same general pattern is overlaid upon the first, except that it is the negative image (dark and clear are interchanged). Now the pair is aligned and held up to the light. As the reference film is moved relative to the sample film the amount of light admitted through the combination will vary according to the degree that the images coincide. The positioning that admits the least light is the best correlation. If the negative image pattern of the reference film is a square or two displaced from the image of the sample film, the positioning that admits the least light will be one that matches that displacement. We take note of which displacement admits the least light; we notice the positioning with the best correlation and say that the fingertip moved that much. That, in effect, is what happens within an integrated circuit (IC) having photo detectors, memory and arithmetic circuits arranged to implement the image correlation and tracking technique we are describing.

The motion sensor may have a "hold" function that suspends the production of motion signals, allowing the fingertip to be physically removed from the image input aperture without disturbing things. This may be needed if the operator runs out of room to physically move his finger further, but further operations are needed. The "hold" function may be performed automatically by noticing that all or a majority of the photo detectors uniformly come to some average level. This is in distinct contrast with the case when there is a focused image and correlation occurs. In the unfocused case the attempt at correlation between frames (recall the one over, one over and one down, etc.) exhibits a distinct loss of correlation that can be detected by the motion transducer. The details of such detection and it production of a loss-of-correlation signal are described at length in the incorporated Patents. The loss-of-correlation signal is the basis for implementing certain special delimiting features in the control schemes described herein.

Figure 2:
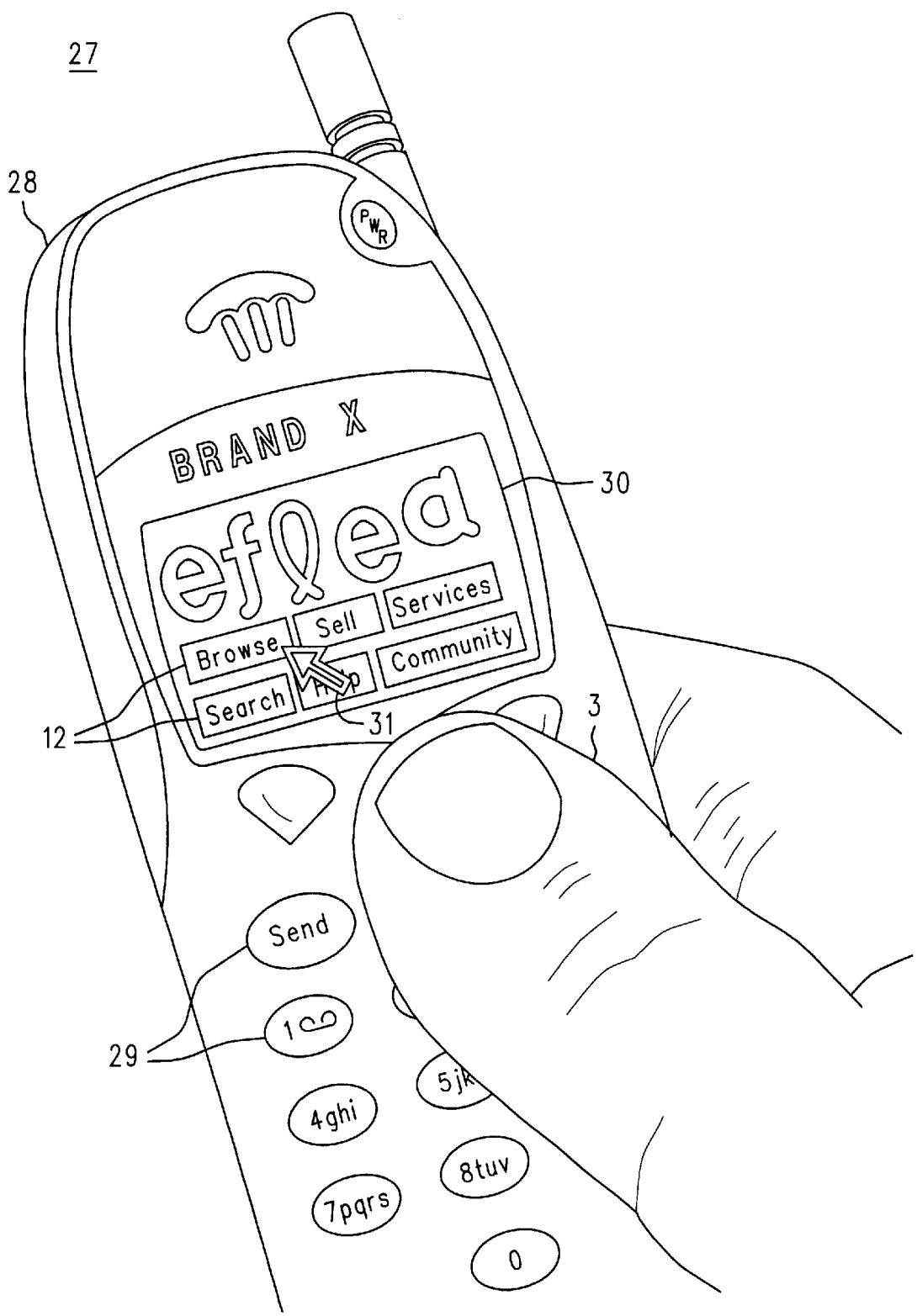
FIG. 2 is an illustration of a wireless telephone displaying a menu that is being traversed according to motion of a user's thumb over a pseudo trackball.

Refer now to FIG. 2, wherein is depicted an illustrative example 27 of the type of appliance that can be controlled in accordance with the invention. In the figure, a user is holding a wireless and internet capable telephone 28 in his left hand. His thumb 3 is covering an optical fingertip tracker (which is preferably a pseudo trackball) that is thus not visible. The telephone appliance 28 includes various keys 29 and a display 30. Within the display are indicia 12, which in this case are menu items pertaining to a web page for an auction service. In this case a screen pointer 31 is positioned over the desired menu entry by moving the thumb in directions corresponding to where the screen pointer is to move, and the thumb pressed inwards against the pseudo trackball to complete the selection. Of course, the phone 28 can be used to hold spoken telephone conversations, as well.

The example of FIG. 2 imputes a fairly complex GUI to the appliance 28, and presumes a fully pixelized display. This would not need to be the case, however, and the screen pointer 32 could be absent, and in its place menu items capable of selection are highlighted (e.g., made to blink or shown in bold or reverse video) as the thumb moves over the pseudo trackball.

The telephone appliance is also depicted with the customary number keys expected on a conventional wireless phone. While there may be good reasons for having them there (an inexperienced user expects them? . . . or perhaps some physical handicap such as blindness requires it . . . ), it will be appreciated that they could otherwise be absent in favor of character recognition performed upon the motion signals produced as the shape of the digit keys were traced out by the tip of the user's finger on one hand as the other hand cradled the phone. Of course, the presence of the conventional number keys does not mean that character recognition cannot be performed in addition to conventional keystrokes. Furthermore, digit character recognition for dialing purposes is readily extended to the alphabetic characters, including various punctuation symbols. This allows, for example, a considerable simplification in the procedures used to store useful tables of names or other labels to be associated with telephone numbers. Digit, character and symbol recognition according to digitized motion signals is an established art in itself, as shown by the incorporated Patents directed to that subject. There are, however, some additional aspects of a user interface that relies upon such a technique, whether for a telephone, PDA ,GPS, or some other appliance, and those will be discussed further on below.

Figure 3:
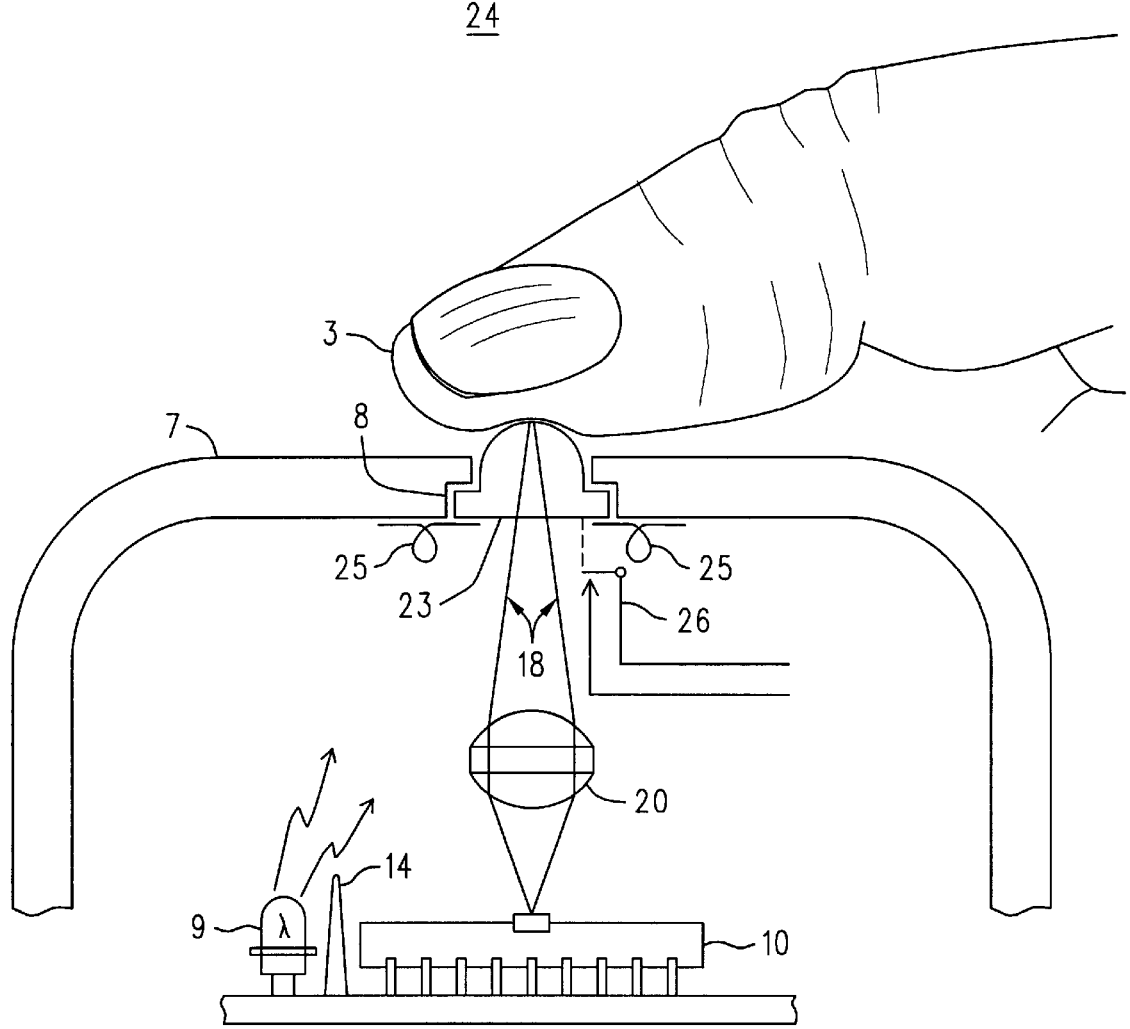
FIG. 3 is a simplified view of a "BB" style miniature pseudo trackball used as a fingertip tracker for an appliance, such as the wireless telephone of FIG. 2.

We turn now to FIG. 3, which is a hybrid cross sectional view 24 of an appliance, after the fashion of FIG. 2, having a fingertip tracker that may be likened to a miniature track ball (although it's really a pseudo trackball). As before, a housing 7 encloses the appliance. The housing also has an image input aperture 8. This time, however, the image input aperture contains a variation (23) on the transparent dome shaped element 6 of FIG. 1; the difference is in shape and manner of retention. Dome shaped miniature track ball "BB" 23 may be of glass or plastic, and the domed portion is preferably about two to three millimeters in diameter, and is retained in place by springs 25, resilient fingers or a flexible gasket. It is retained in a manner that allows the actuation of switch 26 when the thumb 3 presses against the BB track ball 23 with sufficient force. Of course, if there were no switch, or the actuation of the switch did not involve movement or the transmission of force through the BB, it could be rigidly affixed to the housing (e.g., glued, swaged, staked or pressed in).

Note that BB-sized track ball 23 extends above the surface of the housing 7 by perhaps one millimeter or so, and the thumb 3 forms a curved surface over the top of the BB. The forces retaining the BB 23 in the image input aperture of the housing and those needed to actuate the switch 25 are selected to allow a comfortable indentation of the thumb without actuating the switch; a more forceful pressing of the thumb against the BB will actuate the switch.

As in FIG. 1, an LED 9 provides illumination of the surface of the thumb or finger tip whose image is to be tracked by motion transducer 10. Light from LED 9 may travel directly to the underside of the BB 23, be reflected (18) from the digit 3 and then pass through focusing lens 20, or, it could pass through lens 20 both before and after reflection. If LED 9 emitted visible light, then the location of the pseudo trackball would be readily apparent to the user, and he would be reminded of its function. However, it should be remembered that in a battery operated appliance it may also be desirable to turn the LED off after some period of detected non-use in order to conserve power. Also, it may be desirable to pulse the LED at the rate of sample acquisition to save additional power.

The pseudo trackball 23 may have a flat bottom, if desired, or it may have some other optically useful shape. The curved upper surface of the pseudo trackball 23 imparts a curved surface to the fingertip being imaged, but the depth of field of the focusing lens 20 is sufficient to accommodate that curvature.

As for the focusing (or imaging) lens 20, it can be bi-convex and have a diameter of about one mm, a focal length of three mm, and a speed of f3. The object distance and the image distance can each be about six mm. Magnification could be approximately 1:1.

Figure 4:
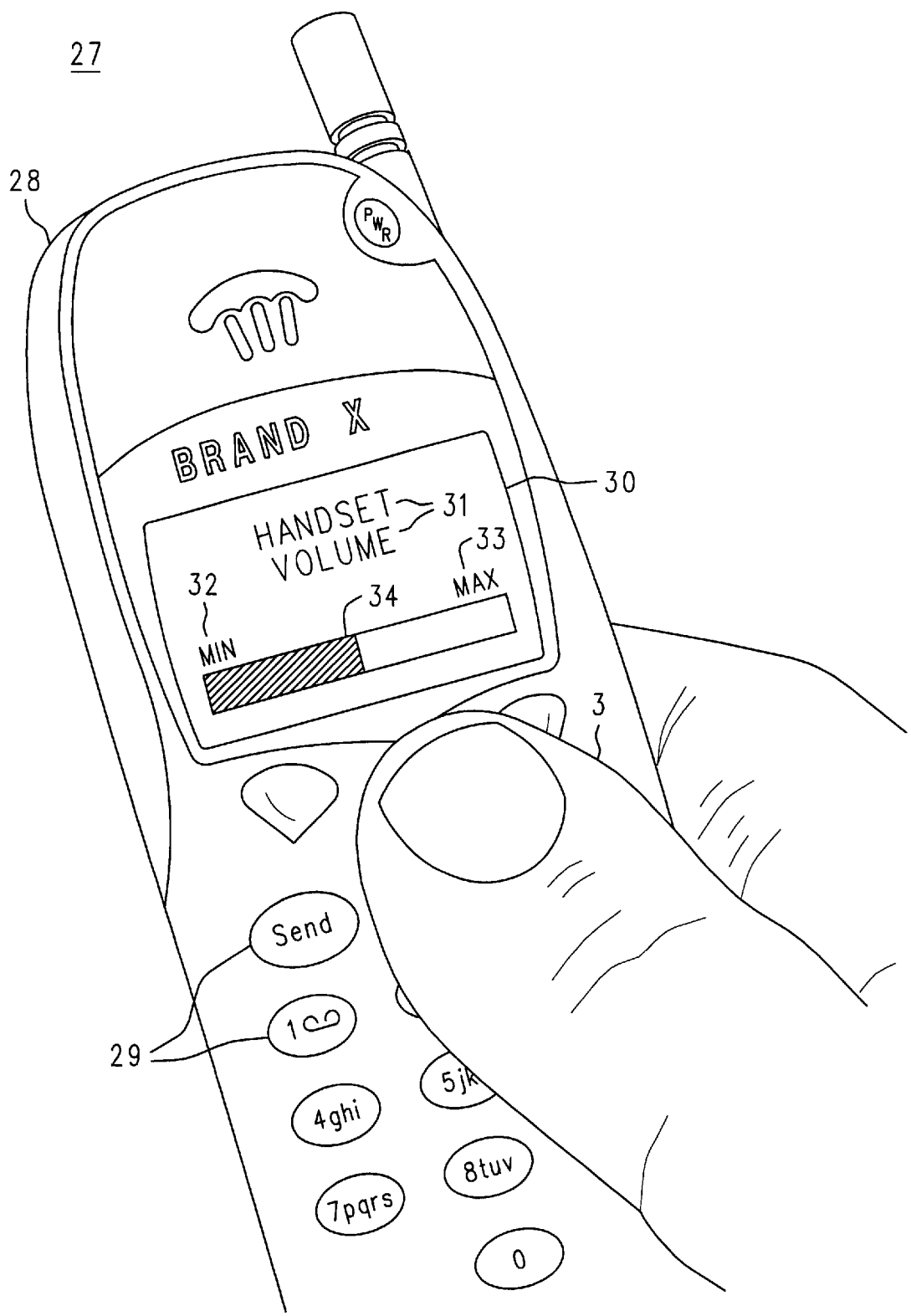
FIG. 4 is an illustration of a user of a wireless telephone setting the volume by moving his thumb over the pseudo trackball.

Refer now to FIG. 4, wherein the wireless telephone 28 of FIG. 2 is shown being operated in a different manner 27 than is shown in FIG. 2. In particular, the operator is adjusting the volume. He does so by first invoking a mode wherein volume is subject to adjustment. This could be done by using a menu selection paradigm, such as was the subject of FIG. 2. Once in the volume adjustment mode, movement of the thumb over the pseudo trackball (not visible) adjusts the length of a bar graph presentation 34 (a visible annunciator), which is preferably supplemented by auxiliary indicia 31, 32, and 33 (permanently visible legends) that assist or remind the operator about the nature of the operation/adjustment under way. Once the bar graph is at a desired setting, pressing against the pseudo trackball ratifies the selection and returns the display to a less specific level of abstraction in the control paradigm. Of course, a bar graph is just one way to visually indicate the setting of a volume control; it could also be indicated with a numerical value, perhaps as a percentage of maximum.

The (conventional) method of visually indicating the volume setting on a phone or other appliance is helpful when setting the volume while no audio program material is being reproduced by the appliance. The danger, of course, is the possibility that a user might inadvertently crank the volume all the way up while there is no audio material to gauge the level, and then later find out the hard way that it is too loud. Just as inconvenient would be to accidentally turn the volume all the way down. Still, when holding a phone or other radio transceiver in an operational manner one can't be expected to see what's shown in a display, even though it is still possible to adjust the volume (or other parameter) with a thumb tip or fingertip while the appliance is being so held. There are ways that can minimize the impact of these circumstances. First, the appliance can decline to adjust the volume unless there is some audio being reproduced to allow the user to gauge its level. That may be a may be an acceptable solution for, say, an AM/FM portable radio intended for, entertainment. In other applications (hand held transceivers) a different solution may be desirable. For example, one could do as Motorola does with its FRS and GMRS transceivers. They have a two button interface with no display that is used to set bandwidth and privacy codes. A stored voice reports choices and selections as the buttons are pushed. Thus our appliance or machine can inform the user with an audio message (e.g., "soft" . . . "Medium" . . . "LOUD") what the state of the volume control is.

Of course, for some control parameters, even audio ones, it may be perfectly acceptable to not produce any visual or other indicator of the parameter, other than the performance of the appliance itself. For example, if a tone control were being adjusted, it could well be sufficient to let the user adjust it until he likes what he hears, and leave it at that.

Figure 5:
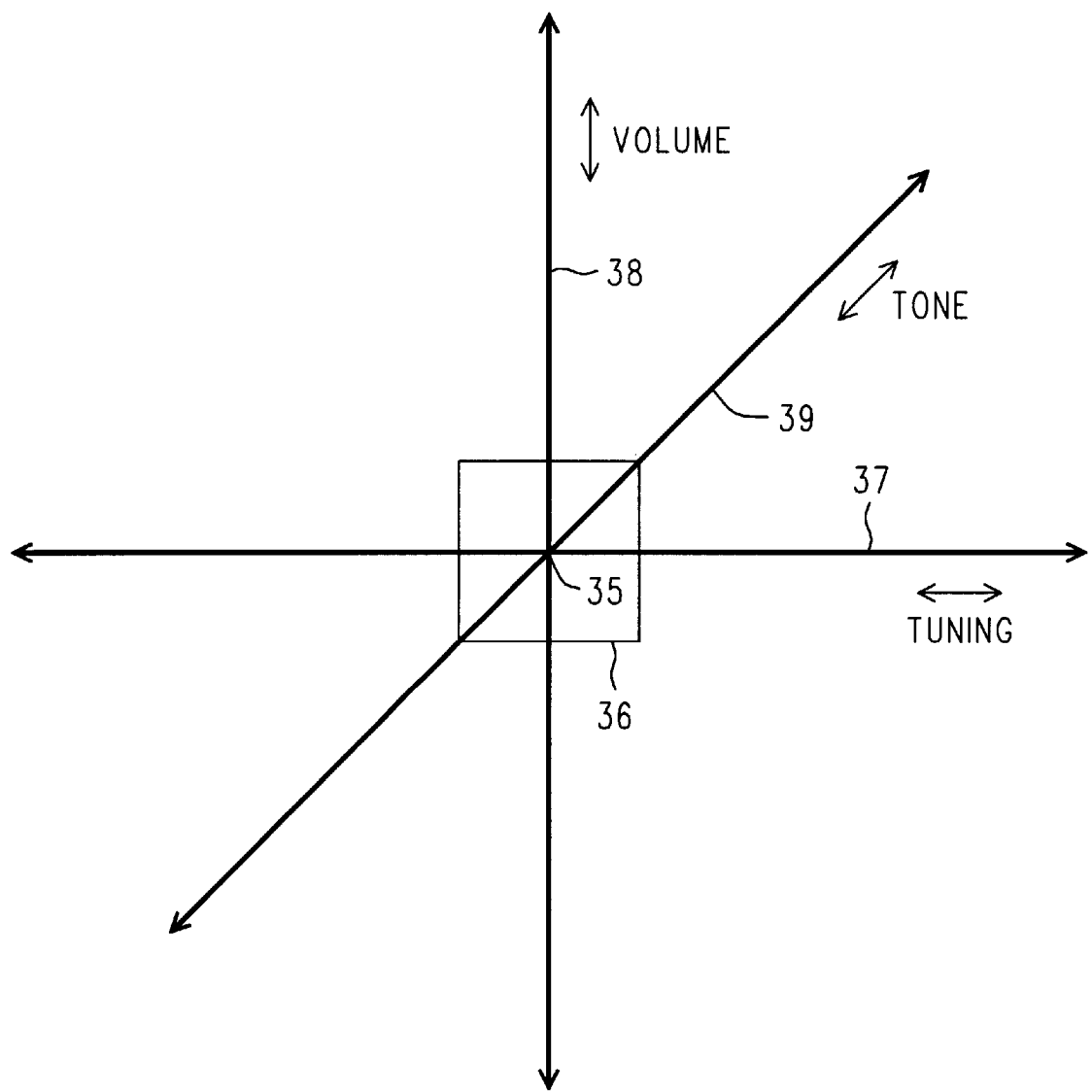
FIG. 5 is a diagram of digit motion along axes that can be detected by an optical motion transducer and used to modify the values of associated control parameters.

Refer now to FIG. 5, which is a diagram useful in appreciating how a pseudo trackball (or other optical fingertip tracker) may be used in setting the value of a control parameter, that has perhaps been, or is yet to be, selected from among a plurality of such control parameters. Let's suppose that the appliance to be controlled is a hand-held radio receiver (not shown). The idea is that one axis of the motion signals (say, the Y axis 38) will represent the volume control, and may now be thought of as a "volume axis." Fingertip or thumb tip motion along the direction of the Y axis 38 will adjust the volume of the receiver. Motion along the direction of an X axis 37 will perform a station or channel tuning function. As an extension of what we are about to explain, we can also contemplate that another appliance control parameter, such as atone control (or perhaps squelch) is to be adjusted by motion along the direction of a third axis 39 that is inclined at forty-five degrees (a convenient, but not necessary, value) to the X and Y axes.

Assume that the appliance has been turned on, and that the user wants to adjust volume. For now, we further assume that there is no preliminary mode selection process that is needed to indicate that the Y axis 38 is to represent volume, as opposed to, say, day of the month. For example, it may be that for this appliance the Y axis 38 is always a volume axis, and is never used for a different control parameter. Anyhow, the user puts the tip of his digit onto the pseudo trackball. The loss-of-correlation signal 40 goes away, and the appliance control circuit 11 is thus alerted that some user control activity is imminent. At this point there has been little or no motion in addition to that required to make contact between the digit and the pseudo trackball, and we may think of the "position" of the digit tip as being at an origin 35 of the various axes. The user now begins to move his digit in the Y direction. However, it might not be in exactly the Y direction only; there may also be a small X direction component to the motion of his digit, even though it is his or her intention to adjust volume without changing the tuning.

Now, it would be possible to simply apply a $\Delta Y$ motion signal to volume adjustment mechanism, while applying a $\Delta X$ motion signal to a tuning adjustment mechanism. This would be the simultaneous adjustment or alteration of two control parameters, and while possible, would probably aggravate the user intensely unless certain precautions were taken. Preferably, then, no control parameters are altered until a decision is made concerning the user's intention. This may be accomplished by requiring that there be a threshold value for accumulated ΔY's accompanied by a suitably low accumulated value of ΔX's. This notion underlies the meaning of the box 36 centered about the origin 35. Our user accomplishes sufficient ΔY motion to meet the volume threshold while keeping the ΔX accumulation low, and the system decides that volume adjustments are in order. At this point it will begin convert signed values of ΔY to corresponding increments and decrements of the volume control setting, and will simply ignore ΔX's while not changing the tuning or the tone setting.

In due course the desired volume setting is reached. At this point the process of changing the volume is concluded, as indicated by either the user lifting the digit away from the pseudo trackball or by his pressing the digit against the pseudo trackball to activate the switch 16/26.

Now there are a number of related alternatives that we should discuss. We begin with the subject of the previous paragraph: concluding the adjustment. It may be that a positive ratification, in the form of activating a switch by pressure from the digit is required. This is free of unexpected artifacts, but is an extra operation. On the other hand, a potential problem with simply lifting the digit is that there may be some unintended additional movement seen by the motion transducer as the lifting proceeds, but before the loss-of-correlation signal 40 is generated. This may or may not be a problems, depending on how things are arranged. Suppose, for example, that a "swipe" of the fingertip along the pseudo trackball produces a ΔY of, say, one thousand twenty-four ($2^{10}$) counts. But suppose that there are only $2^5 = 32$ discrete levels of volume. Then there are about thirty-two counts per volume level, which quantizing will be sufficient to conceal the problem when the user is reasonably careful. Say, for example, that the user can perceive the discrete changes in volume, and stops moving the digit just after a change. Then he may well have a sixteen count window on either side of the current setting to absorb any spurious ΔY and leave that desired current setting unaltered as the digit is withdrawn.

On the other hand, if several swipes were needed to cover the whole range of adjustment with a desired resolution, then removal of the digit could not conclude, but must only suspend, the adjustment process, and an activation of the switch 16/26 is probably needed for indicating the conclusion of the adjustment. A similar situation obtains if there is no quantizing of the mapping between the motion signal and the control parameter, or if very high resolution is demanded. To get the adjusted control parameter to "stay put" while the digit is removed it may be necessary to conclude the adjustment process without introducing the possibility of detecting spurious motion during withdrawal (i.e., by activating a switch).

Detection that a time-out period has expired (say, one second, starting with the last change made to the control parameter) could also be used to conclude the adjustment. To resume adjustment, one would then lift and then replace the digit.

To shift from adjusting volume to changing the tuning or channel selection, the user would conclude the volume adjustment, and begin moving the digit in the X direction. As before, once conditions for accumulated movement are reached (but now that will occur for the tuning axis along the X direction), the system will select tuning as the appliance control parameter to be adjusted, and decline to pay any attention to the ΔY motion signal.

Now suppose that the tone (or another control parameter, say, squelch) is to be adjusted and that this is to be done by motion along the direction of axis 39. As before, we first clarify the user's intentions by examining the initial ΔX's and ΔY's that are produced. If there is going to be an axis 39, then we allow for it by detecting that, for consecutive pairs of ΔX and its associated ΔY, the components of each such coordinate pair are each "close together" in value. (There are several ways this could be determined; e.g., that the absolute value of their difference is less than a selected percentage of the absolute value of their average.) Once that criterion is satisfied, the decision is made that it is the tone (squelch) that is to be adjusted, in accordance with displacement along the axis 39. One could compute actual distances along that axis with the distance formula, but that is probably unnecessary, since either of ΔX or ΔY could be used in place of that distance. The worst that might be needed would be to adjust the proportionality between, say, ΔX and the change to the tone control parameter value, (say, to preserve perceived sensitivity) since ΔX won't be equal to the incremental distance along axis 39: ΔX is instead smaller and is merely proportional to the incremental distance along axis 39.

Figure 6:
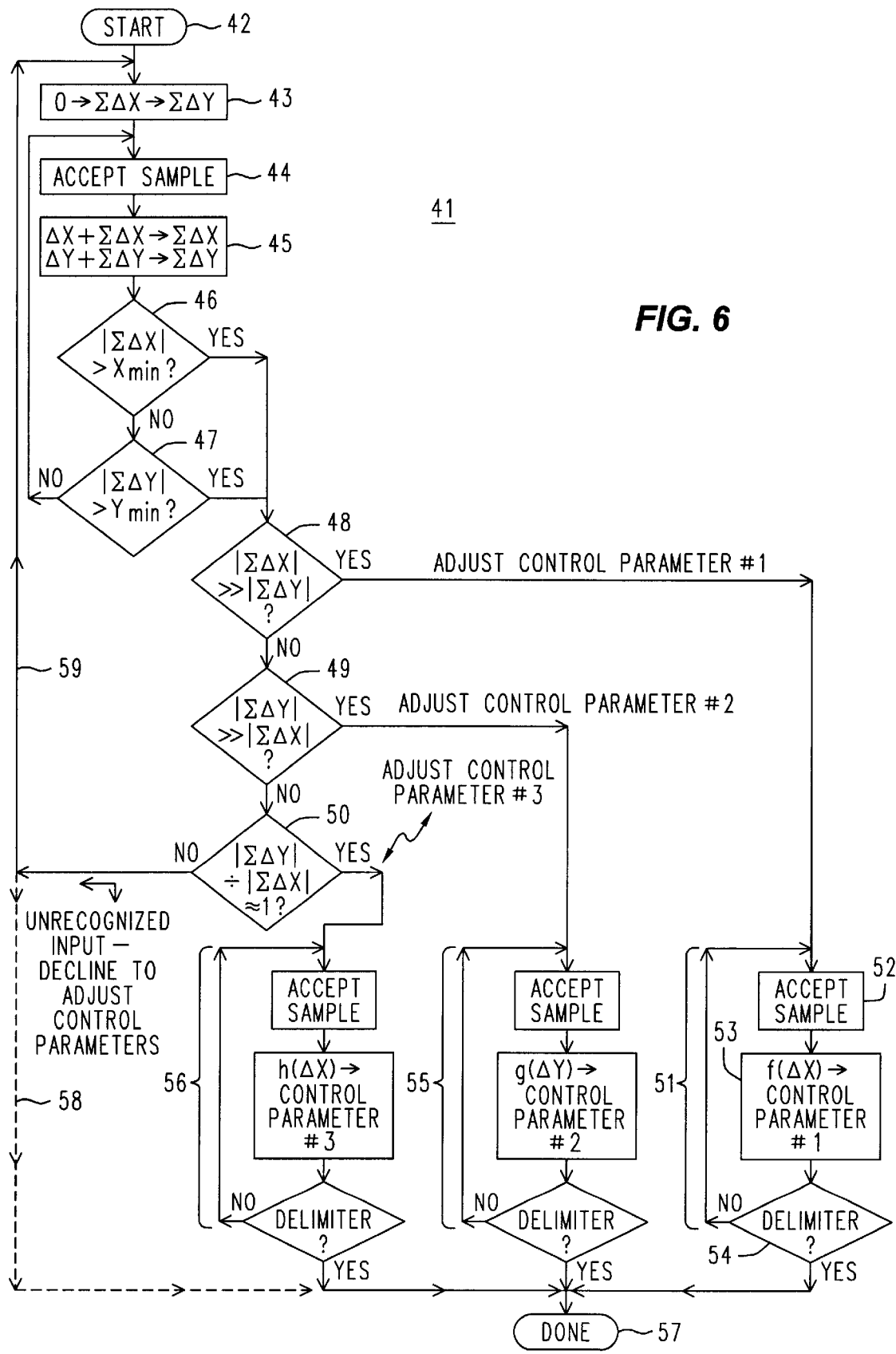
FIG. 6 is a simplified flowchart that illustrates a portion of the internal operation of an appliance or machine that modifies the values of control parameters in accordance with FIG. 5.

Refer now to FIG. 6, which is a simplified flowchart 41 of activity in support of the subject mater of FIG. 5. The flowchart 41 is one example of the many ways that such support activity can be implemented. It begins when the decision is made to use ΔX and/or ΔY to adjust the value of some control parameter, which is represented by START oval 42. The first thing that is done is at step 43, where the variables ΣΔX and ΣΔY are each set to zero. Following that, at step 44 values for ΔX and ΔY are accepted from the motion transducer 10 (which we assume is running all the time, and asynchronously with respect to the flowchart 41). In step 45 these incremental motion values are respectively accumulated into ΣΔX and ΣΔY. This is done to implement the notion of region 36 in FIG. 5, where a certain minimal amount of movement is required before a decision can be made concerning which control parameter value is to be adjusted.

The process of making that decision involves a loop that encloses the step 44 of accepting a sample and the accumulation step 45. At the bottom of the loop are qualifiers 46 and 47, where it is determined if either of the accumulations has increased to a minimum threshold amount that corresponds to leaving region 36.

If the answer to either of qualifiers 46 and 47 is YES, then the subsequent series of qualifiers 48, 49 and 50 determine which of respective axes 37, 38 and 39 represents the motion of the tip of the digit. These qualifiers perform a gross characterization that essentially amounts to a mode selection. It is perhaps best, however, if the three possible "modes" (the "YES" paths for qualifiers 48, 49 and 50) are not a true partition, and that a fourth outcome ("NO" at qualifier 50) that is an unrecognized input (essentially a "none of the above" situation) be provided. The result is a more well behaved user interface.

Also, we have shown a three control parameter case that matches FIG. 5. There could be more parameters. That is, FIG. 5 shows an axis 39 that occupies the first and third quadrants; there could easily be a fourth control parameter axis perpendicular to axis 39 and that occupies that second and fourth quadrants. There could also be control parameter axes that are inclined at thirty and sixty degrees to the X axis, although at some point it becomes difficult for the user to accurately select his desired choice. Any such possibilities would be reflected in the nature of the tests within the series of qualifiers corresponding to the series 48, 49 and 50.

In the same vein, we could as easily have just two, or perhaps only one, control parameter axis. That is, qualifier 50 (and the associated segment 56 for the YES path) could be gone, and the NO path of the qualifier earlier in the sequence (49) leading to where the NO path for qualifier 50 does. As to where that NO path (from, say, qualifier 50) leads, we show two possibilities for the "none of the above" case: paths 58 and 59. Path 59 is perhaps more forgiving, and amounts to ignoring a non-conforming input and allowing the user to try again. Path 58 essentially aborts the attempt to enter the control parameter value adjustment process. One could even have a hybrid scheme that kept track of consecutive NO exits from qualifier 50, and which would use path 59 for, say, the first two such exits and path 58 for a third.

To conclude the discussion of FIG. 6, note that each of the YES paths for qualifiers 48,49 and 50 leads to a respective segment 51, 55 or 56. It is these segments that actually implement the adjustment process for the value of the selected control parameter. Consider segment 51, which adjusts the value of a control parameter #1 (e.g., tuning in FIG. 5). It consists of a loop at whose top is a step 52 ACCEPT SAMPLE. The following step 53 takes the ΔX and uses some f(ΔX) to modify the value of control parameter #1. If there were also visual or displayed indicia to be modified, then that activity would be driven from what happens at step 52, as well. (Note that in segment 55 it is g(ΔY) that modifies the value of control parameter #2, and thatfand g might be the same or different, as appropriate.) Following the modification of the value of the control parameter qualifier 54 returns to the top of the loop (step 52) via its NO path, should there be no delimiter detected. This allows the modification activity to persists until it is gracefully ended, according to the rules of the particular user interface in use. The delimiting action or event could be, for example, activation of switch 16/26, an active loss-of-correlation signal 40, or the expiration of a time-out since the last ΔX. Upon detection of the delimiting event, the YES path transitions to the DONE oval 57, which probably represents some state in a more outward level of abstraction in the user interface as a whole.

Lastly, the arrangement of FIG. 6 can be modified to provide selection of items in a menu without the use of a separate screen pointer. The reader may recall that before mouse-powered windows type operating systems were prevalent, there was a way to navigate a menu using arrows keys, perhaps supplemented by tab and shifted tab keys. The items were arranged in rows and columns, and the selected item was highlighted. Hewlett_Packard Co. used a scheme like this in the early 1980's for its PAM (Personal Application Manager) that ran either under CPM or DOS. In any event, the idea of interest here is that ΔX and ΔY can be properly quantized (ala steps 43–47) to produce the necessary "arrow key" activations to navigate a displayed menu, and without the need for a fully pixilized display and a mouse-like screen pointer movable at the pixel level. One way this could be accomplished is for (modified versions of) f and g to accumulate selected amounts of motion and then output "left/right and up/down arrow" operations. This type of preliminary menu navigation could be how one set of control parameters (from among a plurality thereof) is first selected ahead of time for subsequent later modification via the (unmodified) user interface of FIG. 6.

Figure 7:
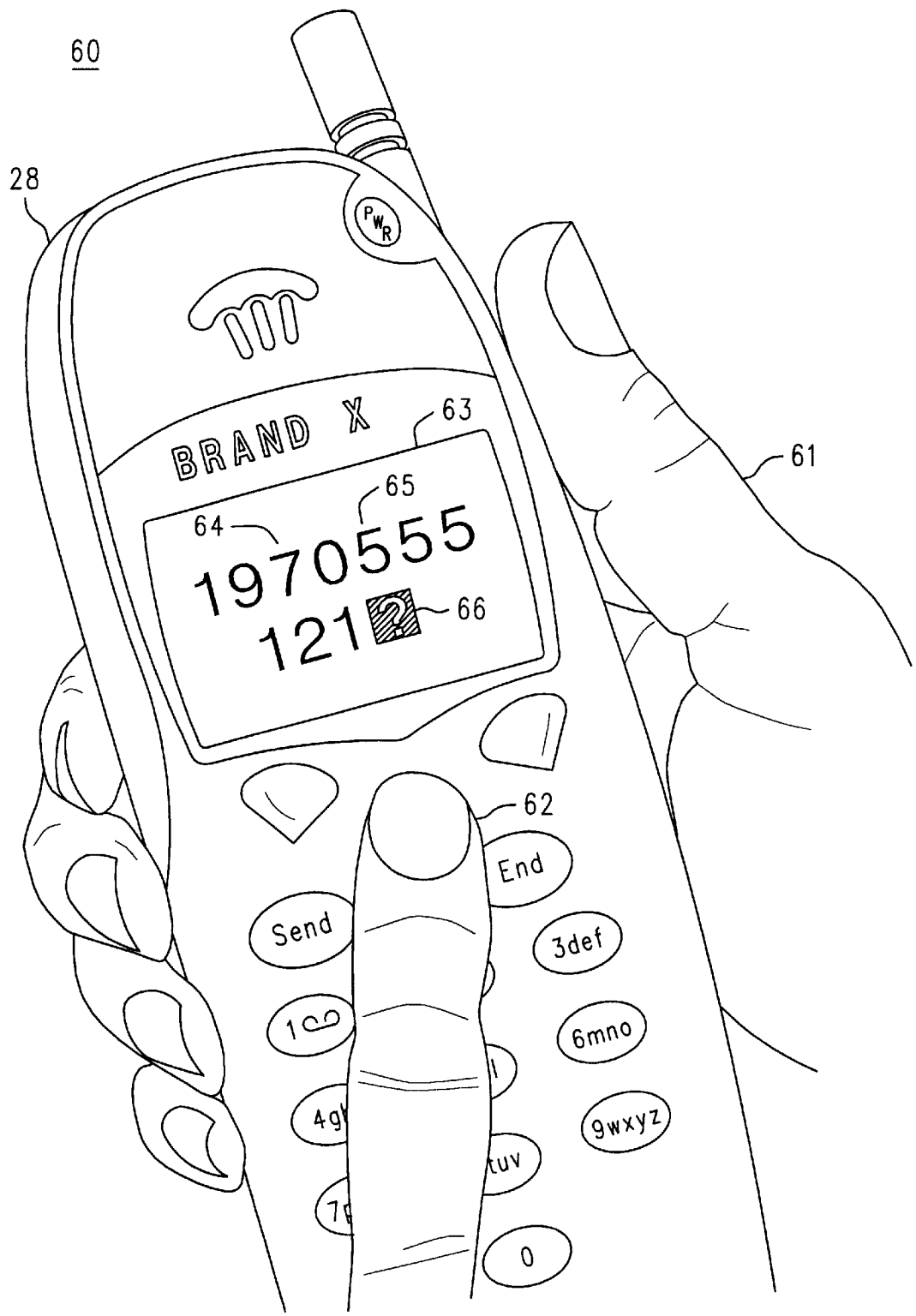
FIG. 7 is an illustration of a user "dialing" a telephone number on a wireless telephone by tracing the digits on a pseudo trackball with the tip of a finger.

Refer now to FIG. 7, wherein a left-handed user is dialing a phone number with the tip of index finger 62 on his left hand while holding a wireless telephone 28 (it could as well be another type of appliance) in his right hand 61. To do this the tip of the digit 62 is moved over the pseudo trackball (or other fingertip tracker) in a way that traces out the shape of the character to be recognized. In the figure, the pseudo trackball is not visible, as it is covered by the fingertip 62. In this example we assume that any needed prior operation to put the phone 28 into the condition ready to accept a phone number has already been accomplished. (That ought not amount to much, since after all, operating on phone numbers input from an operator is a principle thing that phones do. Nevertheless, these days they also do other things as well, and perhaps one of those other modes might need to be ended, before dialing is understood as the operation to be performed.) In any event, the user strokes the digits and they appear in the display 63, some of which are 64 and 65. The number being stroked suggests that our user is interested in Directory Assistance for the area including Denver, Colo. All has gone well, except that, say, someone bumped his elbow as he was stroking the final "2", with the result that the input motion was misshapen to the extent that the phone could not recognize the digit. To indicate this the phone displays a particular character 66, which, although it could be any suitable shape, we have chosen to render as a question mark in inverse video. It could also be, for example, simply as blinking question mark, or any other symbol agreed upon to indicate a confused state of affairs. Also, even though we have not shown it, he initially got the area code wrong, stroking "990" instead of "970". However, he saw this right away and used a backspace mechanism (described below), corrected the mistake, after which he dialed the remainder of the number, as shown.

Figure 8:
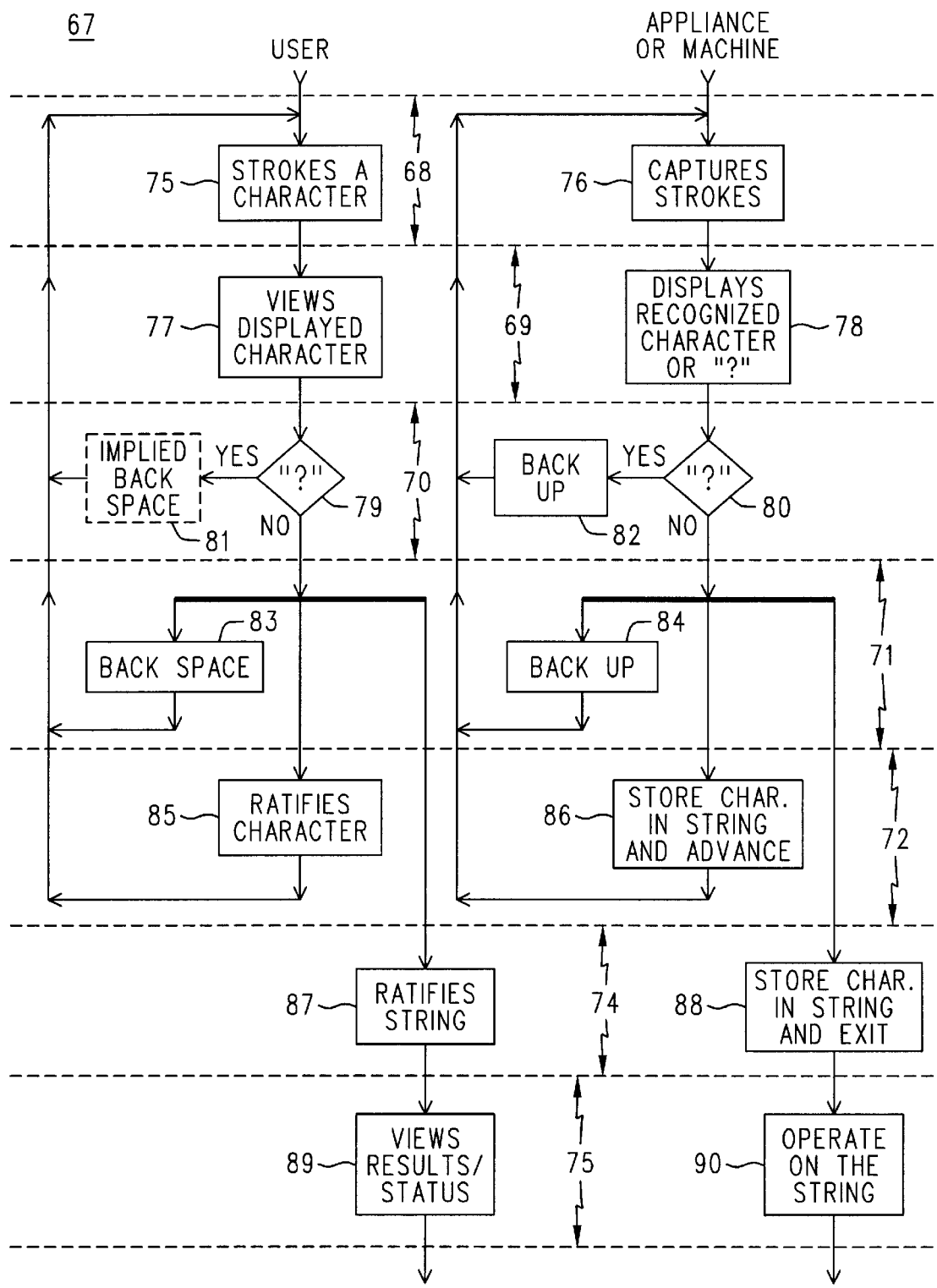
FIG. 8 is a diagram of a pair of simplified flowcharts that have been placed in stepwise correspondence to indicate how an appliance or machine can use a pseudo trackball or other fingertip tracker to enter strings of characters.

Now refer to FIG. 8, where we describe in a general fashion how this type of operation may be implemented using a pseudo trackball or other fingertip tracker. At the outset, we wish to point out several things. First, the appliance might not be a phone; it might be, but is not limited to, a hand-held radio transceiver of the "walky-talky" variety (GMRS, FRS, CB or otherwise), a GPS or a PDA. It could be a camera, and a caption is being added to an image. Next, we have shown digit input. It will readily be appreciated that input of arbitrary character strings are just as useful and possible, depending on the appliance feature being utilized. For example, even for a phone, one might be allowed to dial "MOM" or "KAREN" in place of mom's or the wife's phone number, providing of course that the phone supports tables of labels versus phone numbers, and that it allows direct label entry to take the place of a number (and then looks up the number and then uses it, instead).

Next, the pair of stepwise coordinated flowcharts that we are about to visit in FIG. 8 are indicative of but one way that the type of system we are interested in can be implemented. Furthermore, flowcharts have a certain inadequacy when used for the present purpose. The fundamental property of a flowchart is that you put one finger down on it, and say "that's where we are" and then you get to move that finger according to what the flowchart allows for. There are NEVER two fingers at the same time on a particular flowchart! A flowchart works best when it represents the sequential aspects of a single unified process of "fetch and execute" type programmed mechanisms (Von Neumann machines).

Immediate response to an asynchronous event is not well represented by a flowchart, especially when there are different responses to different events. Communication between separate flowcharts helps, and we shall assume that there is such a mechanism between the flowcharts of FIG. 8. Even so, things get ugly within a true flowchart if a great deal of previous state information is needed to make decisions, or asynchronous external events can cause immediate activities.

Such environments are often best served by (one or more) state machines, whose representations are state diagrams. A state diagram is fundamentally different from a flowchart, just as a state machine is fundamentally different from a fetch-and-execute machine. Those who deal frequently with state machines appreciate the limitations of a strict flowchart, and would agree that a state diagram for a state machine was fundamentally not a strict sequential flowchart. Indeed, it is likely, even probable, that a detailed description of an actual implementation of the material described in the flowcharts of FIG. 8 would involve several state machines, and maybe only one or even no "fetch and execute" type programmed mechanisms (Von Neumann machines) that are accurately represented by a strict flowchart. Even so, the flowcharts of FIG. 8 are, in general, still useful and informative, because they operate at a fairly high level of abstraction that tends to be sequential in nature. They also have the virtues of brevity, and that we won't run out of fingers!

Without further ado, then, let us examine the pair 67 of flowcharts shown in FIG. 8. One of the pair (the one on the left side) is a flowchart that represents possible user activity. The flowchart on the right represents corresponding activity by the machine or appliance as, for example, user activity of the sort described in connection with FIG. 7 occurs. The correspondence is indicated by the regions 68–74 created by the horizontal dashed lines that traverse the figure. Thus, for example, activity 75 of the user flowchart is accompanied by activity 76 of the appliance flowchart. It will be appreciated that an activity such as activity 76, "CAPTURE STROKES" is certainly a large scale process in its own right, complete with sub-processes that are themselves made of component processes, and so on. There are different strategies that may be used for the character recognition that is embodied in activities 76 and 78, and the reader is referred to the incorporated Patents for further information about how those processes may be implemented. What we are going to assume is that the user will move his fingertip in essentially the same way that the tip of a pen or pencil would be used to inscribe individual digits or other characters. That is, a string of characters is not joined by connecting line segments, as in written script, but is instead presented as if it were individual printed characters that do not touch. We leave to the individual implementation the issue of whether or not particular characters need to be stroked in special ways (so as to aid in identification), while striving to provide an overall user interface that tolerates a large degree of flexibility with regard to that and related issues. In particular, we do not want to require that the fingertip never leaves the imaging surface during the stroking of a character: maybe it does, maybe it doesn't. The implication is that we need to be careful about what use we make of transitions in the loss-of-correlation signal 40. In particular, the issue of whether or not the character recognition process uses signal 40, and if so, how, is up to that process. Thus, if we treat character recognition as a black box component in a character string entry process, some context information may be needed to assist in correct interpretation of transitions in the loss-of-correlation signal 40, for say, delimiting input and ratifying displayed indicia representing what has been recognized.

To continue, then, we assume that the appliance is in a state where it expects the user to stroke a character. This is represented by region 68 of FIG. 8. What the user does is stroke the character (activity 75), while at the same time the appliance captures those strokes (activity 76). In region 69 of FIG. 8 the appliance determines what character has been stroked it places it in the display (activity 78), whereupon the user may view it (activity 77). It may be desirable that the character recognition mechanism be assisted in the process by the user lifting his finger away from the image aperture at the end of the character. After a sufficient length of time (longer than the interval between component strokes) the appliance may infer that the character is finished. It might also use a period of time with no detected motion (but with the finger still on the image aperture) for the same purpose. If the appliance decides that it cannot determine that a legitimate character was stroked, then it displays some symbol indicating that condition, which we have here selected to be a reverse video question mark (66).

Region 70 provides a mechanism for dealing with unrecognized input. The appliance declines to enter a next character onto the end of a string of recognized characters, leaving various pointers unincremented. To the user it may appear that there is an implied backspace (81), since the reverse video question mark does appear in the display. But to the character string recognition process, it is simply a re-try. We assume that the user lifts his finger after the completion of each character, so that upon the replacement of the fingertip after the YES transitions for qualifiers 79 and 80, the appliance removes the reverse video question mark from the display (activity 82), the user registers an implied backspace (81) and both flowcharts re-enter region 68. The "replacement of the fingertip" is, of course, represented by a suitable transition in the loss-of-correlation signal 40.

Now assume that a legitimate character has been recognized and displayed. It still might not be the one that the user intended. Either the user stroked the wrong character by mistake, or he was sloppy in his execution, causing the appliance to get the wrong answer. In any event, the user can decline to ratify the new character and instead cause a genuine backspace, so that it may be replaced with what is intended. This is the subject matter of regions 71 and 72 of the figure. One convenient way to represent an explicit backspace command is with a "tap" of the fingertip against the pseudo trackball or other fingertip tracker. A tap is a brief period of essentially motionless contact, say fifty to one hundred and fifty milliseconds in length, although these durations could be adjustable, just as the interval for recognizing a "double click" in a conventional windowed operating system. A backspace could also be indicated by an activation of the switch 16/26, if that were deemed more convenient. Whatever indicates a backspace, when it occurs (activity 83) and is subsequently detected, the resulting activity 84 is to back up one character in the output string, and remove from the display the character that has been backspaced over. At this point the region 68 is re-entered in preparation for entry of the correct character. A series of deliberately spaced taps (i.e., with at least a minimum amount of time separating them, so as not to be confused with a double tap) would serve as consecutive backspaces. (The implication is that activities 76/78 must also recognize additional taps that occur before genuine strokes are detected. For brevity, we have omitted such complicating properties of the flowchart. Those who design these types of system will appreciate that state machines are good at dealing with these kinds of context sensitive issues.) Another possible action within region 71 is that the user ratifies the character he sees in the display. Preferably, all he needs to is to simply begin stroking the next character after having has his finger off the imaging aperture for a brief period of time. That is, if the displayed character is not the inverse video question mark, a subsequent occurrence of the loss-of-correlation signal 40 that lasts at least some minimum length of time may be taken as implied ratification.

This is especially convenient, as it allows a sequence of correctly stroked and interpreted characters to be input without any extra folderol. Of course, it could be arranged that characters are expressly ratified by an available or otherwise unused operation, such as a tap, a double tap, or activation of switch 16/26.

A third possible action within region 71 is that the user is satisfied with the string displayed, and wishes for it to be implemented, or operated upon in whatever way is appropriate for the appliance at hand. For example, in the case of the telephone of FIG. 7, he may want the telephone number just entered to be dialed. That is, he wished to ratify the entire string and initiate some next phase of appliance operation. A preferred way to do this is for the user to simply tap twice in a row, with less than a certain amount of time between the taps (ala a double click with a mouse button). Alternatively, ratification could be signaled by activation of switch 16/26, as desired. This activity is the subject of region 73 in FIG. 8, where activity 88 stores the next character into the string and then exits (to activity 90) in response to the user's having ratified the string (activity 87). Finally, once the string of characters has been ratified, region 74 represents the appliance's operation on the string (activity 90) and the user's viewing (or whatever) of the subsequent results or status (activity 88).

Thus, we see that two character recognition outcomes and three control operations or commands are useful in character input by stroking the characters: displayed trial characters, a displayed no-good character symbol, an explicit backspace command, an implied character ratification command, and an explicit string ratification command. In addition, an implied backspace command is useful. We have seen how these may be implemented in a context sensitive manner from among the primitive operations of pushing on the imaging aperture to activate a switch, taping and double tapping the image aperture, all in conjunction with the assumption that the fingertip doing the stroking is lifted between characters, and without assuming what happens within a character.

A few final remarks are perhaps in order concerning the notions of "tap" and "double tap". A tap is, as defined above, a short period of (essentially) motionless contact between the fingertip and the fingertip tracker. Two taps within a suitable interval are a double tap. One could even go so far as to implement a triple tap. It might be defined as a reset of some sort, and would be useful in embodiments where there is no separate key or button that is readily available for that function. An example might be a hand held appliance having an absolute minimum of mechanical controls. Say, it has a pseudo trackball and a display, and little or nothing else. It might have a menu driven user interface. The question arises: "What does the user do if gets into the middle of some menu tree or unfamiliar (and to him, seemingly dysfunctional) mode, and he becomes hopelessly confused or frustrated beyond repair. He needs a readily applied and reliable escape mechanism that will cancel an activity and return control to more familiar territory. A triple tap can be the means to initiate such an escape. A triple tap is easy to do, requires no special mechanical parts, and is unlikely to be issued or recognized accidentally.

In a system that recognizes stroked characters, one of which is a dot or period, it may then become necessary to distinguish between a tap and the stroked character that is the dot or period. This may readily be done by noticing the length of time the fingertip is in motionless contact with the fingertip tracker. If it is "short", then it is a tap, whereas if it is longer than a certain amount it is the dot or period.

Figure 9:
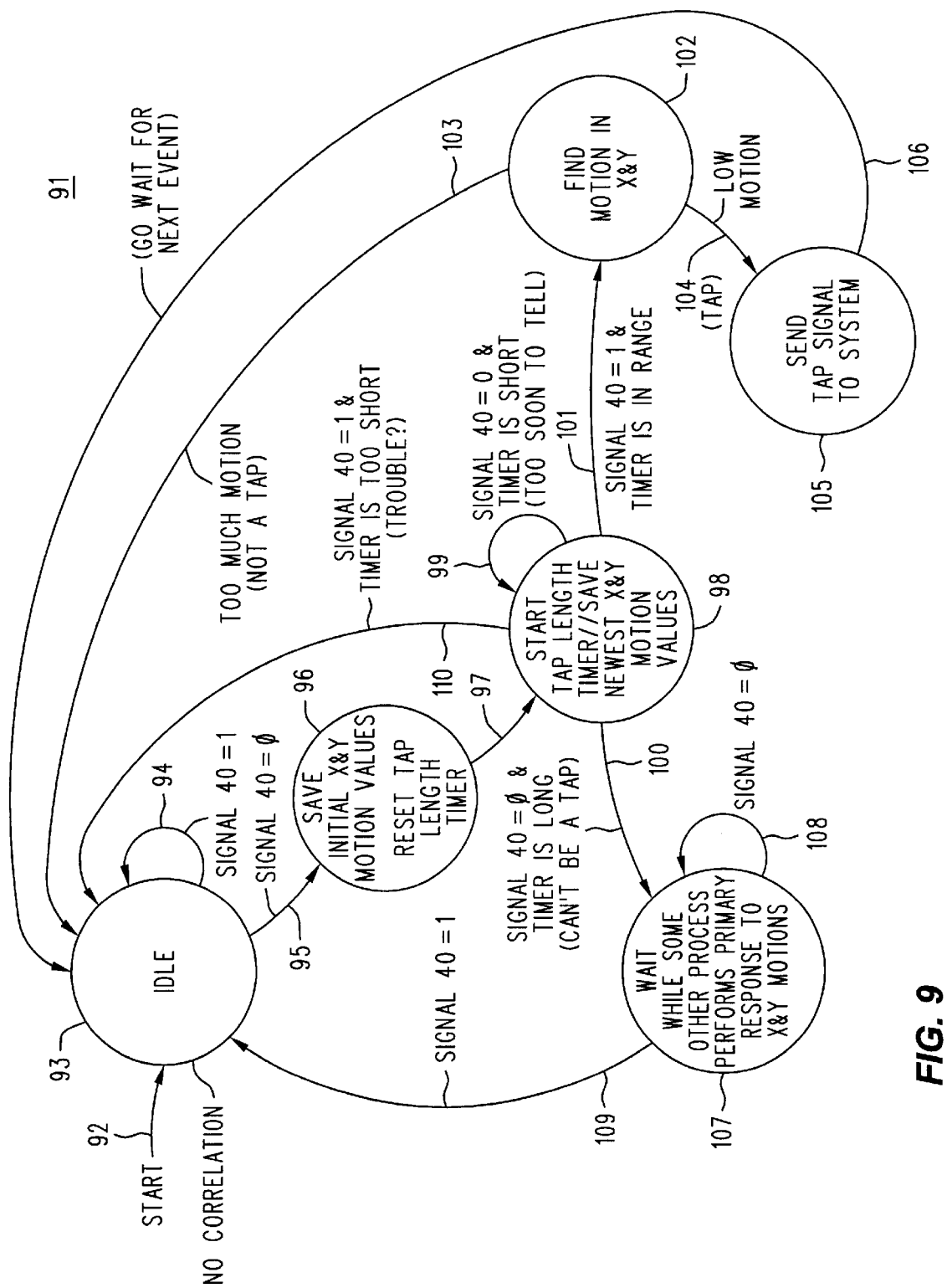
FIG. 9 is a state machine diagram for a state machine that identifies when a user performs a single tap with his fingertip against the fingertip tracker.

FIG. 9 is a simplified state machine diagram 91 for a mechanism that may be used to discover if there has been a tap. The assumptions here are that there are a collection of hardware resources that can be dedicated to this task, in addition to the qualifiers and such that are the state machine proper. None of this hardware is shown, as its exact form would be contingent upon a particular implementation. The assumed resources are some registers to hold values of the X and Y motion signals, a timer, and various arithmetic comparison circuits.

A START signal that is associated with turn-on or a major system reset causes a transition 92 to state 93, which is an IDLE state that is maintained (transition 94) as long as signal 40 (the loss-of-correlation signal) remains present. Eventually (or even at the outset) the user puts his finger on the image input aperture, after which signal 40 is, in due course, no longer exerted. This causes transition 95 to state 96, where the current X and Y motion values are saved as "initial X and Y motion values" and a tap length timer is reset to zero. Following that there is a transition 97 to state 98, where a tap length timer is started and the current X and Y motion values are saved as "newest X and Y motion values".

There is only one way to remain in state 98: signal 40 remains false (continued correlation —finger is still there) and the tap length timer has a small value. This just means that it is too soon to tell if there is going to be a tap, or not. While remaining in state 98 the tap length timer continues to increment, and newest X and Y motion values continue to be stored.

There are three ways to leave state 98. The earliest would be transition 110, which occurs if signal 40 is again exerted (finger lifted) but the tap length timer is quite small. This case is shown as a probable anomalous condition; say, the tap length timer has a count of one, representing perhaps one hundred microseconds. Nobody has a finger that fast, so it is likely that something is amiss, although the way this state machine 91 is drawn the detected anomaly is simply ignored.

The second way to leave state 98 is via transition 100, which is caused when the count in the tap length timer gets too large. Then this can't be a tap, and is most likely regular operation. The transition is to state 107, which is essentially another IDLE state, maintained by transition 108 (continued correlation) until correlation is lost and transition 109 re-enters state 93. State 107 can be described as an IDLE or WAIT state, since we assume that some other independent mechanism or process performs the primary response to the X and Y motion signals (e.g., sets the value of an appliance control signal).

The third way to leave state 98 is via transition 101 to state 102, which occurs when signal 40 is again exerted and the tap length timer has a value that is in range. This means that there has potentially been a tap. To find out, state 102 performs the necessary arithmetic to discover the amounts of motion in X and Y since the start of the potential tap. That is accomplished by using the "initial" motion values saved in state 96 and the latest of the "new" motion values saved in state 98. If the motion is low enough, it is a tap and transition 104 leads to state 105, where a TAP signal is issued to the system. After that, transition 106 leads back to IDLE state 93 to await the next event. On the other hand, if there was too much motion discovered by the arithmetic of state 102, then there was not a valid tap and transition 103 leads directly back to IDLE state 93, bypassing the issuance of the TAP signal.

One could imagine that a tap not require the low motion test of state 102 and transition 104, and rely instead simply on timing. This might work adequately in systems that do not perform character recognition, although it would preclude the ability of the user to perform a series of fast and short "adjustments" to a value being controlled, since they would otherwise resemble a tap. Systems that do perform character recognition are apt to have many intermediate events that would qualify as a tap unless precluded by a minimal or non-motion requirement.

Also, state diagram 91 indicates a number of transitions (94, 99, 108) that, in an actual minimized machine, would not appear as genuine transitions, but would instead merely be absent (they represent a case where no action is needed— no transition). We show them here for the sake of completeness, and to have a "kinder, gentler" state diagram.

Figure 10:
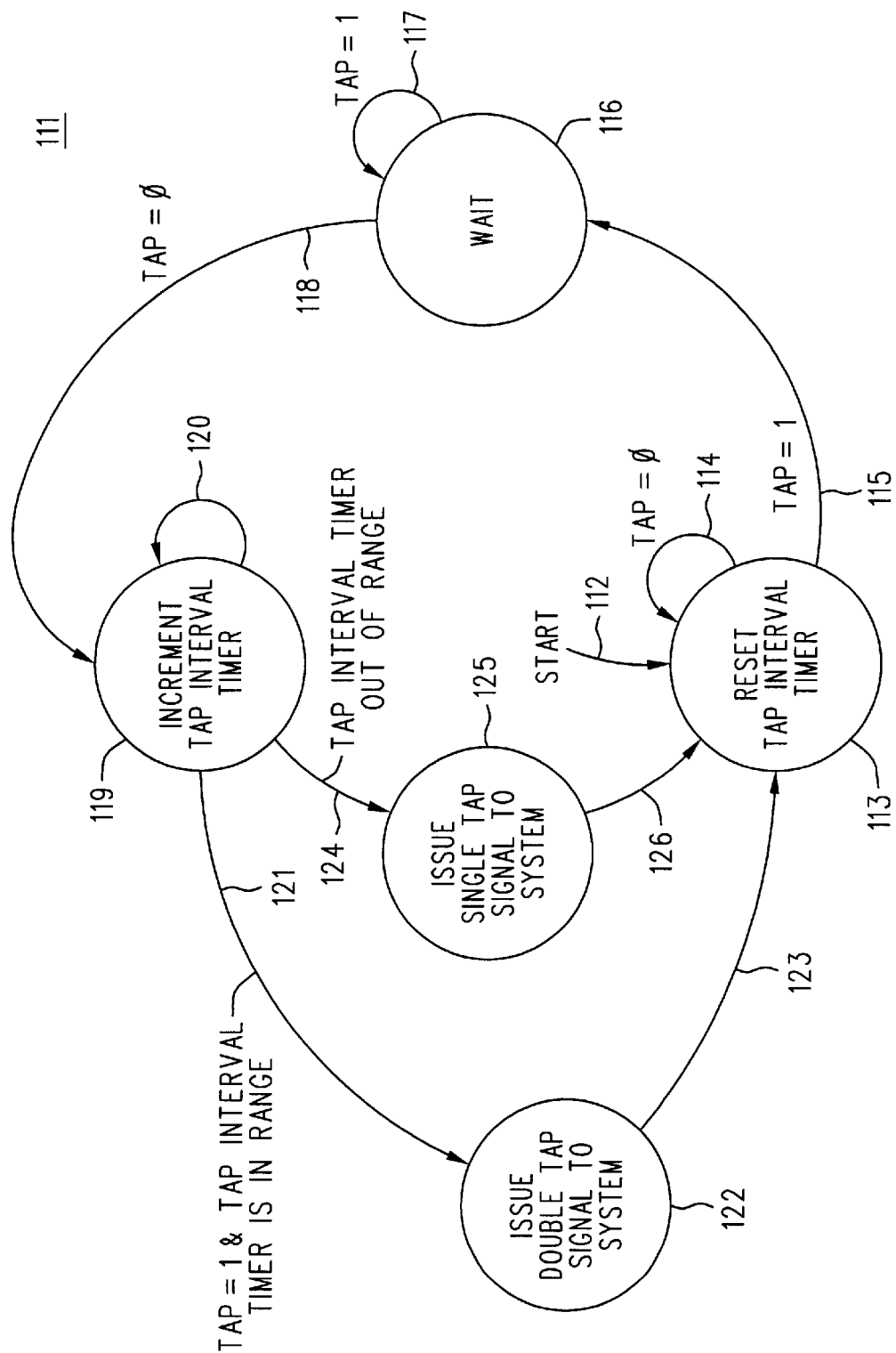
FIG. 10 is a state machine diagram for a state machine that identifies when a user performs a double tap with his fingertip against the fingertip tracker.

We have also described how a double tap could be useful. FIG. 10 a simplified state machine diagram 111 describing how a double tap can be detected, given that the state machine of FIG. 9 is available. The state machine diagram 111 of FIG. 10 assumes that a resettable timer and some arithmetic comparison circuitry are available resources. Also, one minor modification of FIG. 9 is needed if the state machine 111 of FIG. 10 is to be present. That modification is that the TAP signal issued in state 105 is not issued to the overall system, but is instead sent only to the state machine implementing state diagram 111. That state machine will decide if there has been a single tap or a double tap, and will then issue to the overall system an individual single tap signal or an individual double tap signal, as appropriate. The reason for this is, of course, the assumption that a single tap and a double tap are intended to be mutually exclusive events, and that we don't want the activity associated with an initial tap to begin until we are sure that there has not been a double tap. Of course, it could be otherwise, say tap were BACKSPACE and double tap were RESET. Then it might not matter that a BACKSPACE was initiated and then later clobbered with a RESET. But it certainly would matter if tap were BACKSPACE and double tap were RATIFY or EXECUTE.

Refer now to FIG. 10, and note that a START signal (which may the same one as in FIG. 9) causes a transition 112 to a state 113, where a tap interval timer is reset to a value of zero. State 113 is maintained until the signal TAP (from state machine diagram 91 of FIG. 9) is received. This is the meaning of the TAP=0 transition 114. When TAP=1 (which we assume for simplicity is like a pulse—we omit any latch or handshake as being conventional wisdom about how inter-machine communication like this is accomplished) transition 115 leads to state 116, where we wait (via transition 117) until TAP is again zero. Transition 118 to state 119 is thus an escapement mechanism metering one instance of TAP.

Once in state 119 the tap interval timer is allowed to increment. Initially, state 119 is maintained by TAP remaining zero via transition 120. Eventually, however, TAP will occur again (a potential double tap) or the tap interval timer will increment above some limit for construing two consecutive taps as a double tap. The first of these cases occurs when TAP is again exerted and the tap interval timer is within range. Transition 121 leads to state 122, where a signal DOUBLE TAP is issued to the overall system. Following that, transition 123 leads back to state 113, so that the whole process can begin again.

On the other hand, the tap interval timer can increment out of range while in state 119. That corresponds to no double tap, and causes a transition 124 to state 125, where (since there was an instance of TAP) a signal SINGLE TAP is issued to the overall system. Following that, transition 126 leads back to state 113, so that the whole process can begin again.

It will, of course, be appreciated that if both state machine diagrams 91 and 111 are to be implemented, then they could be combined into one mechanism. It is convenient to shown things as we have, since it might be the case that only the state machine 91 of FIG. 9 is present.

Finally, it will further be appreciated that, whether one or both of the state machines for state diagrams 91 and 111 are present, their actual location in a block diagram such as 1 of FIG. 1, could be within control circuit 11 (motion transducer is ignorant of such niceties as taps and double taps) or (preferably) within the motion transducer 10 itself. In this latter case the motion transducer would issue not only a loss-of-correlation signal 40 (if needed) but also additional signals (not explicitly shown in FIG. 1, but implicit in FIGS. 9 and 10) TAP and DOUBLE TAP.

We claim:

1. Input apparatus for controlling the operation of an appliance according to motion of the tip of and operator's digit along a plurality of coordinate axes by (a) selecting an entry from within a displayed menu of choices and (b) adjusting the value of an appliance control parameter, the input apparatus comprising:

a housing containing the appliance;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce motion signals that correspond to motions in the directions of coordinate axes by the fingertip moving against the image input surface and that represent operator input to control the operation of the appliance;

an embedded system coupled to the motion signals and that directs the operation of the appliance in response to inputs made by an operator of the appliance;

the embedded system including a motion signal selector that examines corresponding instances of the first and second motion signals to determine if one thereof has a magnitude larger than the other by a selected amount, and if so, construes the motion signal with the larger magnitude as input made by the operator while also construing the other motion signal as having a magnitude of zero, and also examines the corresponding instances to determine if they have magnitudes that are of generally equal absolute value, and if so, construes the first and second motion signals as having magnitudes of zero while producing a third motion signal corresponding to motion of the tip of the digit along an axis inclined to the coordinate axes;

a display coupled to the embedded system and that displays indicia corresponding to a menu of choices available to the operator for affecting the operation of the appliance;

the embedded system treating one of the first and second construed motion signals as input made by the operator to select in the direction of the corresponding coordinate axis an entry in the menu by altering corresponding displayed indicia in accordance with that input, treating the other of the first and second construed motion signals as input made by the operator to select in the direction of the other coordinate axis another entry in the menu by altering corresponding displayed indicia in accordance with that input; and the embedded system treating the third motion signal as input made by the operator adjust the value of an appliance control parameter associated with the selected entry in the menu.

2. Input apparatus as in claim 1 wherein the display includes indicia corresponding to the value of an appliance control parameter associated with the selected menu entry.

3. A method of setting the value of an appliance control parameter affecting the operation of an appliance, the method comprising the steps of:

placing the tip of an operator's digit against an imaging surface;

moving the tip of the digit across the imaging surface in patterns corresponding to user input;

illuminating that portion of the digit that is against the imaging surface;

focusing light reflected from the illuminated portion of the digit as an image onto an array of photo detectors that are part of a motion transducer;

digitizing the output values of the photo detectors and storing the digital results as a reference array in a memory;

subsequent to storing the reference array, digitizing the output values of the photo detectors and storing the digital results as a sample array in a memory;

correlating the sample array with the reference array and also with nearest neighbor shifted versions of one of those arrays array to produce first and second motion signals having respective first and second values indicative of motion along respective axes by the tip of the digit as it moves across the imaging surface; and setting the value of a first appliance control parameter in accordance with the value of the first motion signal and the value of a second appliance control parameter in accordance with the value of the second motion signal.

4. A method as in claim 3 further comprising the step of displaying an indication of the value to which the appliance control parameter is set by the setting step.

5. A method as in claim 3 further comprising the steps of recognizing the removal, brief and substantially motion-free replacement and subsequent removal of the digit against the imaging surface, and then in response that recognition, performing a selected appliance operation.

6. Input apparatus for controlling the operation of an appliance, the input apparatus comprising:

a housing containing the appliance;

absent from the appliance a keyboard for entry of separate keystrokes representing individual letters of the alphabet;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit light may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce first and second motion signals that correspond to motions in the directions of orthogonal first and second coordinate axes by the tip of the digit moving against the image input aperture and that represent operator input to affect the operation of the appliance; and an appliance control circuit coupled to the first and second motion signals, disposed internal to the appliance and that controls the operation of the appliance by altering the value of the first appliance control parameter in accordance with the first motion signal and by altering the value of the second appliance control parameter in accordance with the second motion signal, the altering being responsive to motion of the tip of the digit against the image input aperture.

7. Input apparatus as in claim 6 further comprising a lens assembly located within the image input aperture.

8. Input apparatus as in claim 7 wherein the lens assembly comprises a rod lens.

9. Input apparatus as in claim 7 wherein the lens assembly has a dome shape and a portion of which extends beyond an outer surface of the housing.

10. Input apparatus as in claim 9 wherein the dome shaped lens assembly has a diameter of about two to three millimeters.

11. Input apparatus as in claim 6 wherein the image input aperture holds a transparent surface that is generally flat and in about the same plane as an outer surface of the housing at the location thereof whereat the image input aperture is located.

12. Input apparatus as in claim 6 wherein the image exit surface comprises a mirror.

13. Input apparatus as in claim 6 wherein the image exit surface comprises a lens.

14. Input apparatus as in claim 6 further comprising indicia coupled to the appliance control circuit and indicating which appliance control parameter among a plurality thereof is changed in accordance with the motion of the fingertip against the image input aperture.

15. Input apparatus as in claim 14 further comprising a display coupled to the appliance control circuit and wherein the indicia comprises a menu element in a menu of choices, the menu element containing a legend associated with an appliance control parameter.

16. Input apparatus as in claim 14 wherein the indica comprises a visible annunciator disposed next to a permanently visible legend associated with an appliance control parameter.

17. Input apparatus as in claim 6 further comprising indicia coupled to the appliance control circuit and indicating the value of an appliance control parameter as it is altered in accordance with the motion of the tip of the digit against the image input surface.

18. Input apparatus as in claim 17 wherein the indica comprises a bar graph display.

19. Input apparatus as in claim 17 wherein the indicia comprises a digital display of a numeric value.

20. Input apparatus as in claim 17 wherein the alteration to the appliance control parameter is a trial alteration that does not affect the operation of the appliance until ratified by the operator.

21. Input apparatus as in claim 20 further comprising an electrical switching device actuated by pressure exerted against the image input aperture and electrically coupled to the appliance control circuit, and wherein ratification of a trial alteration in accomplished by actuating the electrical switching device.

22. Input apparatus as in claim 6 wherein the correlation of the arrays produces interpolated motion signals representing motion corresponding to less than the size of spatial features in the image.

23. Input apparatus as in claim 6 further comprising an electrical switching device actuated by pressure exerted against the image input aperture and electrically coupled to the appliance control circuit.

24. Input apparatus as in claim 23 wherein there are a plurality of appliance control parameters and the appliance control circuit construes actuation of the electrical switching device as a delimiter that separates the alteration of the value of one appliance control parameter from the alteration of the value of another appliance control parameter.

25. Input apparatus as in claim 6 further comprising a loss-of-correlation signal produced by the motion transducer in response to an absence of the operator's digit from the image input aperture and coupled to the appliance control circuit, wherein there are a plurality of appliance control parameters and the appliance control circuit construes the presence of the loss-of correlation signal as a delimiter that separates the alteration of the value of one appliance control parameter from the alteration of the value of another appliance control parameter.

26. Input apparatus as in claim 6 further comprising a loss-of-correlation signal produced by the motion transducer in response to an absence of the operator's digit from the image input aperture and coupled to the appliance control circuit, and wherein the appliance control circuit responds in a selected maimer to excursions in the loss-of-control-signal produced by the operator removing the digit from the image input aperture, briefly replacing it without substantial motions in the directions of the coordinate axes, followed by again removing the digit.

27. Input apparatus for controlling the operation of an appliance, the input apparatus comprising:

a housing containing the appliance;

absent from the appliance a keyboard for entry of separate keystrokes representing individual letters of the alphabet;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit light may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce first and second motion signals that correspond to motions in the directions of orthogonal first and second coordinate axes by the tip of the digit moving against the image input aperture and that represent operator input to affect the operation of the appliance;

an appliance control circuit coupled to the first and second motion signals, disposed internal to the appliance and that controls the operation of the appliance by altering the value of a first appliance control parameter in accordance with the first motion signal and by altering the value of a second appliance control parameter in accordance with the second motion signal;

the appliance control circuit also comprising a third appliance control parameter, and further wherein motion of the tip of the digit along a path within a region inclined by a selected amount to one of the coordinate axes and of a selected width, is construed by the appliance control circuit as input from the operator to alter the value of a third appliance control parameter according to the tip of the digit's motion along that path and to leave the values of the first and second appliance control parameters unchanged; and the altering of the first, second and third appliance control parameters being responsive to motion of the tip of the digit against the image input aperture.

28. Input apparatus for controlling the operation of an appliance, the input apparatus comprising:

a housing containing the appliance;

absent from the appliance a keyboard for entry of separate keystrokes representing individual letters of the alphabet;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit light may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce first and second motion signals that correspond to motions in the directions of orthogonal first and second coordinate axes by the tip of the digit moving against the image input aperture and that represent operator input to affect the operation of the appliance;

an appliance control circuit coupled to the first and second motion signals, disposed internal to the appliance and that controls the operation of the appliance by altering the value of a first appliance control parameter in accordance with the first motion signal and by altering the value of a second appliance control parameter in accordance with the second motion signal;

the appliance control circuit also comprising a third appliance control parameter, and further wherein when the first and second motion signals have the same signs and substantially the same absolute amount of motion, then the appliance control circuit construes the combination of the first and second motion signals as motion along the third axes and as operator input to alter the value of the third appliance control parameter in accordance with that motion; and the altering of the first, second and third appliance control parameters being responsive to motion of the tip of the digit against the image input aperture.

29. Input apparatus for controlling the operation of an appliance, the input apparatus comprising:

a housing containing the appliance;

absent from the appliance a keyboard for entry of separate keystrokes representing individual letters of the alphabet;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit light may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce first and second motion signals that correspond to motions in the directions of orthogonal first and second coordinate axes by the tip of the digit moving against the image input aperture and that represent operator input to affect the operation of the appliance;

an appliance control circuit coupled to the first and second motion signals, disposed internal to the appliance and that controls the operation of the appliance by altering the value of a first appliance control parameter in accordance with the first motion signal and by altering the value of a second appliance control parameter in accordance with the second motion signal;

the appliance control circuit also comprising a third appliance control parameter, and further wherein when the first and second motion signals have differing signs and substantially the same absolute amount of motion, then the appliance control circuit construes the combination of the first and second motion signals as motion along the third axes and as operator input to alter the value of the third appliance control parameter in accordance with that motion; and the altering of the first, second and third appliance control parameters being responsive to motion of the tip of the digit against the image input aperture.

30. Input apparatus for controlling the operation of an appliance, the input apparatus comprising:

a housing containing the appliance;

absent from the appliance a keyboard for entry of separate keystrokes representing individual letters of the alphabet;

an image input aperture in the housing and against which a portion of the tip of one of the operator's digits may be placed;

a light source disposed proximate the image input aperture and that emits light which illuminates a portion of the tip of the digit placed against the image input aperture;

an image exit surface optically coupled to the image input aperture and from which reflected light that is an image of the tip of the operator's digit light may exit;

a motion transducer disposed proximate the image exit surface and that receives the image, from which the motion transducer creates pixelized representations comprising a newly sampled array, a previously sampled array and shifted versions of one of those arrays that are its nearest neighbor arrays, which one array and its nearest neighbor arrays are correlated with the non-shifted array to produce motion signals that correspond to motions in the directions of coordinate axes by the tip of the digit moving against the image input surface and that represent operator input to affect the operation of the appliance, the motion transducer further producing a loss-of-correlation signal in response to an absence of the operator's digit from the image input aperture; and an appliance control circuit, coupled to the loss-of-correlation signal and to the motion signals, disposed internal to the appliance and which controls the operation of the appliance by altering the value of at least two appliance control parameters in accordance with motion of the tip of the digit against the image input aperture, and further wherein the appliance control circuit construes the presence of the loss-of correlation signal as a delimiter that separates the alteration of the value of one appliance control parameter from the alteration of the value of another appliance control parameter.

* * * * *